(12) United States Patent
Martinez et al.

(10) Patent No.: US 9,218,020 B1
(45) Date of Patent: Dec. 22, 2015

(54) COMPUTING DEVICE ASSEMBLY

(71) Applicant: Amazon Technologies, Inc., Reno, NV (US)

(72) Inventors: Angel Wilfredo Martinez, Cupertino, CA (US); Michael Xingyi Yu, Mountain View, CA (US); Joshua Paul Davies, Fremont, CA (US); Brandon Michael Potens, Campbell, CA (US); Andrew McIntyre, San Francisco, CA (US); Joshua Danel Lemons, San Jose, CA (US); Kelly Erin Johnson, Menlo Park, CA (US)

(73) Assignee: Amazon Technologies, Inc., Reno, NV (US)

( * ) Notice: Subject to any disclaimer, the term of this patent is extended or adjusted under 35 U.S.C. 154(b) by 117 days.

(21) Appl. No.: 14/195,523

(22) Filed: Mar. 3, 2014

(51) Int. Cl.
*G06F 1/16* (2006.01)
(52) U.S. Cl.
CPC .................. *G06F 1/1613* (2013.01)
(58) Field of Classification Search
USPC ............... 174/480, 481, 260, 264, 257, 250;
365/185.05, 1.1; 361/679.27, 679.17,
361/679.09, 679.22, 679.54, 679.55,
361/679.08, 679.06, 679.21, 679.3, 679.07,
361/679.24, 679.26, 679.15, 679.57,
361/679.11, 679.05, 679.58; 345/173, 156,
345/179, 110, 157, 163, 174, 690, 175;
248/276.1, 584, 900, 456, 460, 147,
248/550, 576; 16/239, 297, 400, 367, 340,
16/342, 337, 225; 244/17.11, 99.6
See application file for complete search history.

(56) References Cited

U.S. PATENT DOCUMENTS

| | | | |
|---|---|---|---|
| 5,008,060 A | 4/1991 | Kanai et al. | |
| 6,541,089 B1 | 4/2003 | Hamerski et al. | |
| 7,318,293 B2 | 1/2008 | Ardern, II | |
| 7,781,056 B2 | 8/2010 | Bries et al. | |
| 7,869,206 B2 | 1/2011 | Dabov et al. | |
| 8,218,306 B2 | 7/2012 | Lynch et al. | |
| 8,345,410 B2 | 1/2013 | Ternus et al. | |
| 8,432,678 B2 | 4/2013 | McClure et al. | |
| 8,570,736 B2 | 10/2013 | McClure et al. | |
| 8,763,977 B2 * | 7/2014 | Huang et al. | 248/456 |
| 2009/0081407 A1 | 3/2009 | Giraud | |
| 2013/0328730 A1 * | 12/2013 | Guterman et al. | 343/702 |
| 2015/0043143 A1 * | 2/2015 | Chen et al. | 361/679.27 |

* cited by examiner

*Primary Examiner* — Hung Duong
(74) *Attorney, Agent, or Firm* — K&L Gates LLP

(57) ABSTRACT

A computing device is assembled to withstand drops, to be re-workable, and to reduce unaesthetic variances between the components. A computing device has a display module that is removably hinged on the bottom, held in place by snap fits on the top before being screwed in place, and held in place by replaceable snap fits on the sides. A battery module and a battery connector can be secured in place with stretch removable tape. A peripheral port component may be biased towards an interior of the housing opening when installed. A laser direct structuring antenna module located in a recess of a plastic molding can be grounded to a metal alloy housing. A plastic molding can be mechanically interlocked to a housing.

20 Claims, 31 Drawing Sheets

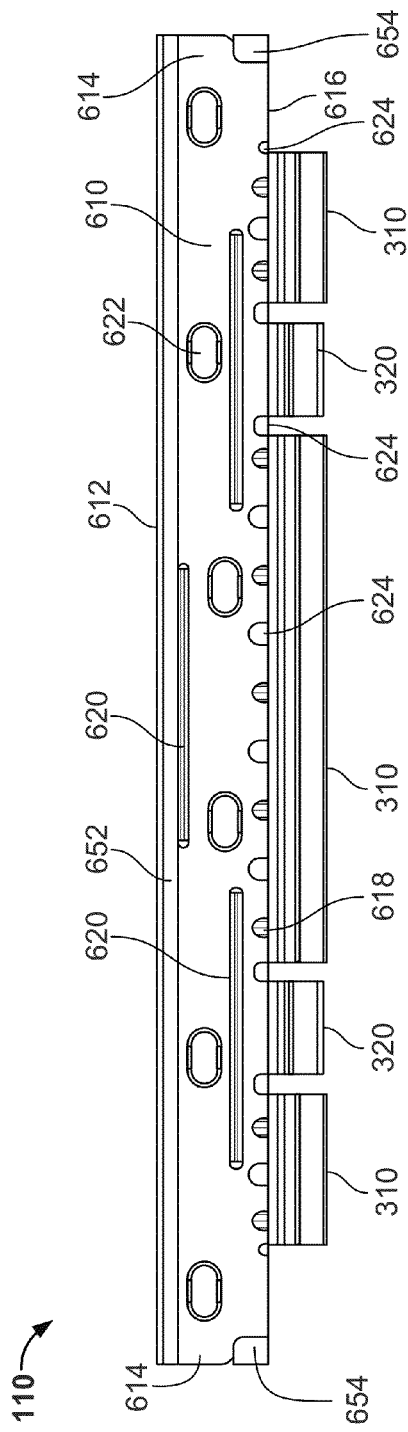
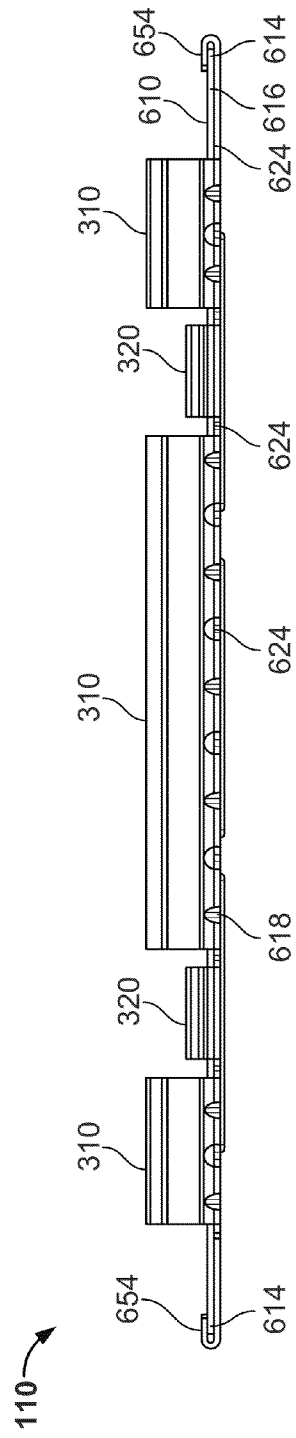

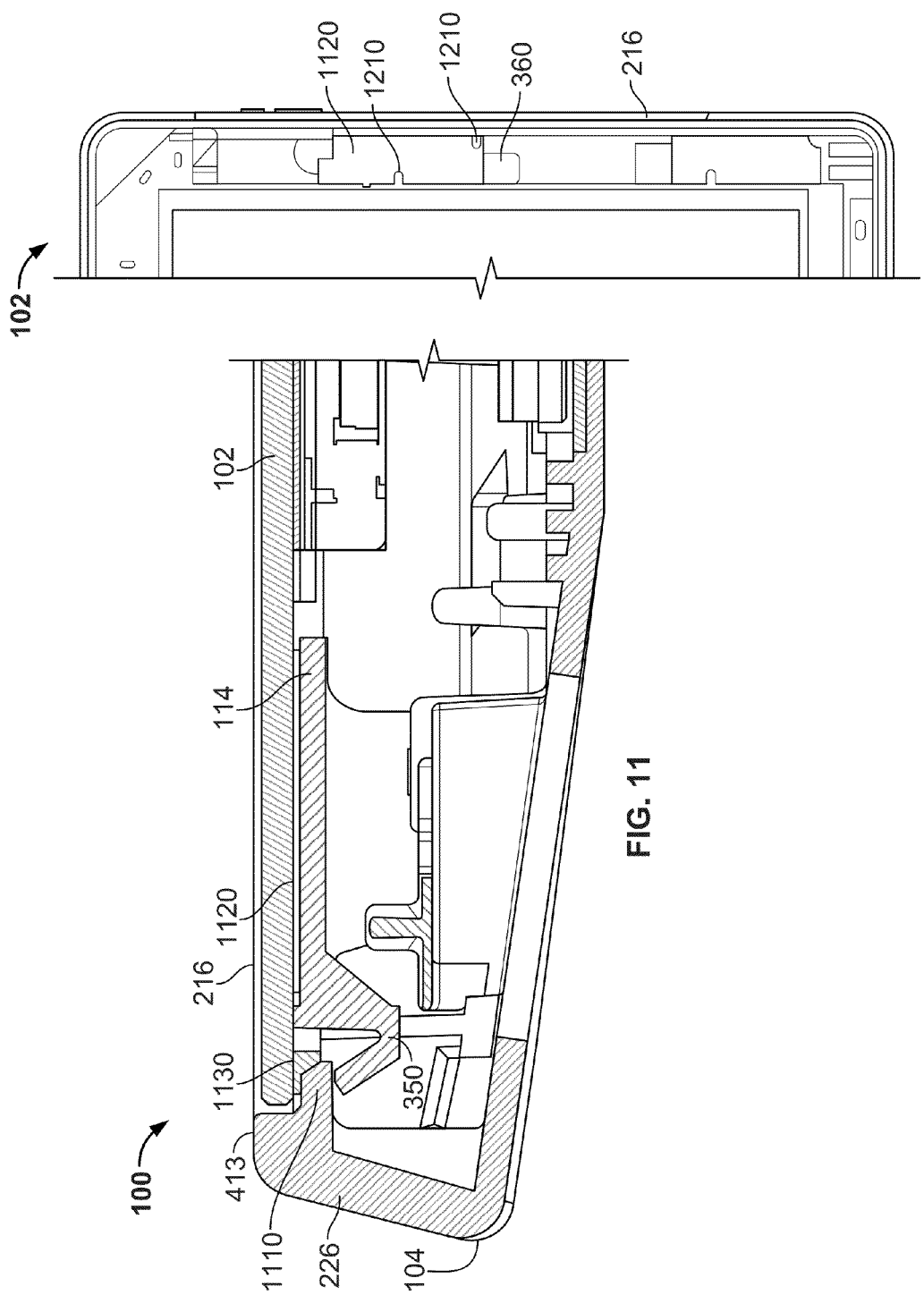

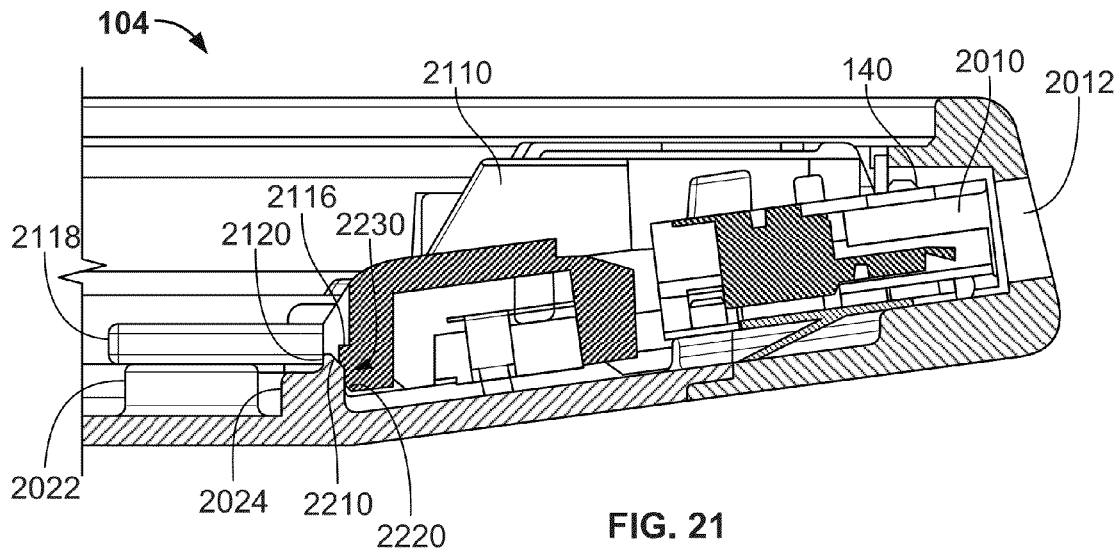
FIG. 21
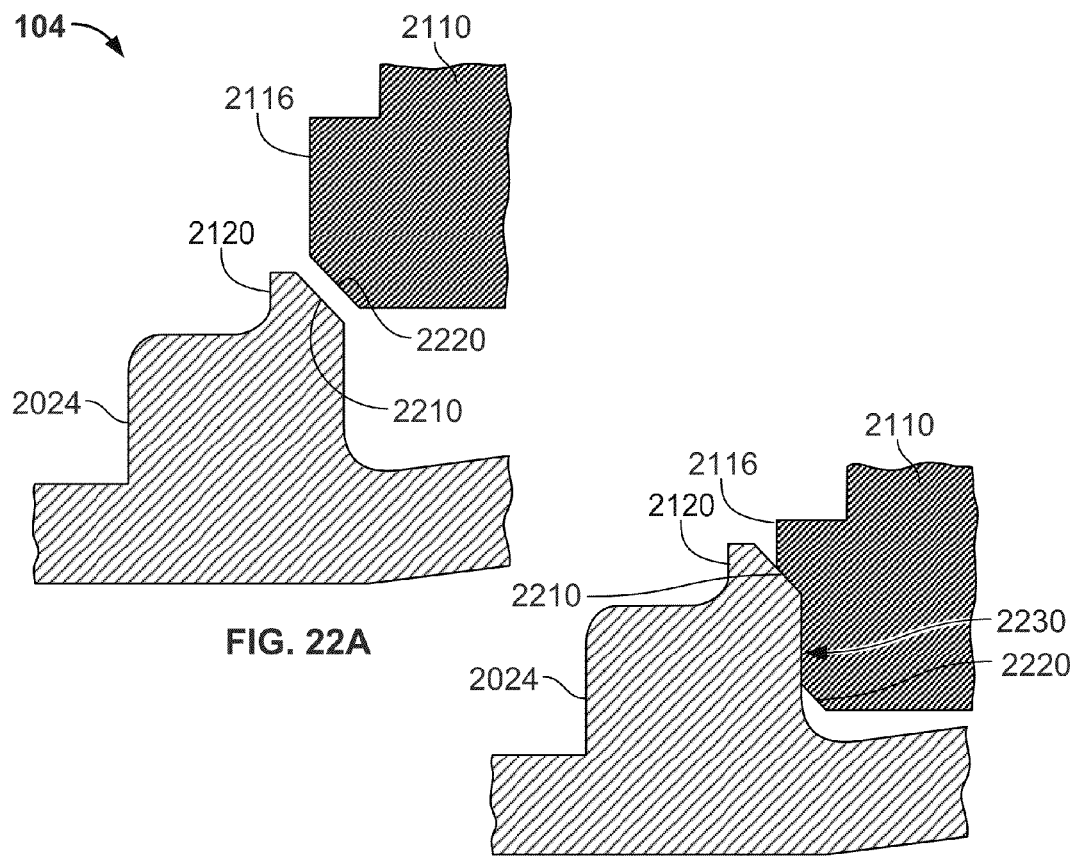
FIG. 22A
FIG. 22B

COMPUTING DEVICE ASSEMBLY

BACKGROUND

Mobile computing devices, such as tablets and smartphones, are commonly subject to being accidentally dropped. When a device falls, the device may collide with a hard surface, resulting in a shock or force applied to the device. Such an impact may cause deformation or fracturing of components that can result in increased variations and imperfections that exceed acceptable tolerances. Because mobile computing devices are typically designed for light weight and small size, the components often form complicated geometries that make it difficult to access and repair the components. Furthermore, to prevent displacement from a fall, components may be adhered together with a strong or structural bond. However, such strong bonds may make it more difficult to open or dismantle the device for servicing without damage.

Accordingly, there is a need to assemble mobile computing devices for at least one of improved reworkability, improved disbursement of kinetic energy, and improved limits of variations.

BRIEF DESCRIPTION OF DRAWINGS

FIGS. 6A-6D illustrate a hinge retainer in accordance with various embodiments of the present invention.

FIG. 11 illustrates a cross-sectional view of an example mobile computing device in accordance with various embodiments of the present invention.

FIG. 12 illustrates a top view of a side portion of an example display module in accordance with various embodiments of the present invention.

FIG. 21 illustrates a perspective view of a port component and a connector module in a housing in accordance with various embodiments of the present invention.

FIGS. 22A-22B illustrate cross-sectional views of a connector module in a housing in accordance with various embodiments of the present invention.

DETAILED DESCRIPTION

In the following description, reference is made to the accompanying drawings which illustrate several embodiments of the present disclosure. It is to be understood that other embodiments may be utilized and system or process changes may be made without departing from the spirit and scope of the present disclosure. The following detailed description is not to be taken in a limiting sense, and the scope of the embodiments of the present invention is defined only by the claims of the issued patent.

In accordance with embodiments of the present invention, mobile computing devices are provided that may be reworkable, resilient to impacts, and within specified tolerances. Mobile computing devices may be assembled according to embodiments of the present invention, the assembly including improved reworkability, reduced fragility, and reduced unaesthetic gaps between components, among others.

Figure 1:
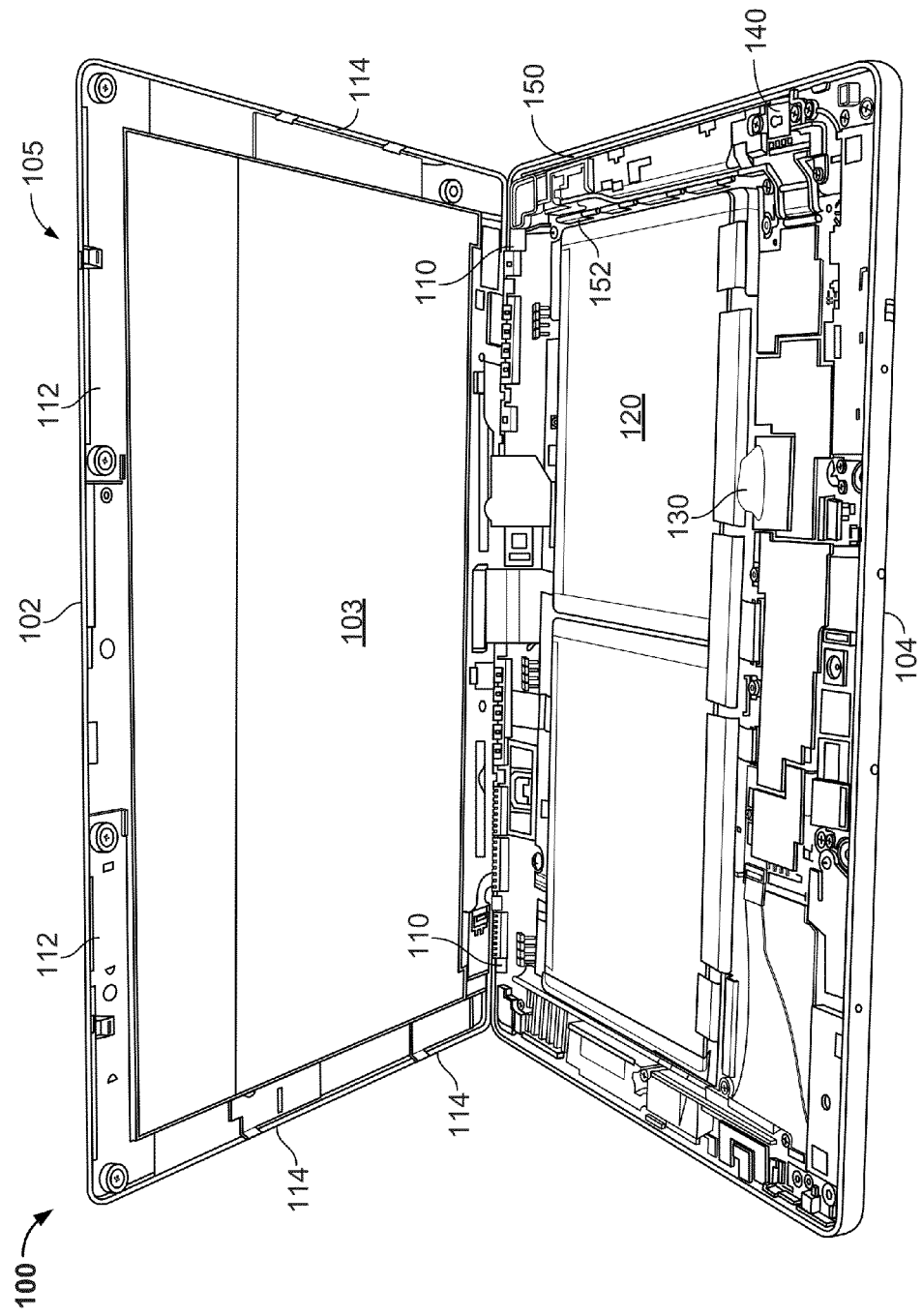
FIG. 1 illustrates a perspective view of an example mobile computing device in accordance with various embodiments of the present invention.

FIG. 1 illustrates a perspective view of an example mobile computing device 100 in accordance with various embodiments of the present invention. The mobile computing device 100 comprises a display module 102 and a housing 104 which couple together to enclose the components of the device 100. The display module 102 comprises a display panel 103 for producing images (e.g., a liquid crystal display (LCD) panel) coupled to a cover glass portion 105, which forms a protective outer surface of the assembled device 100. The cover glass portion 105 may comprise a high strength glass, such as alkali-aluminosilicate glass, commonly used for portable touch screen computing devices.

In the embodiment shown, the display module 102 may comprise at least one hinge retainer 110, at least one latch retainer 112, and at least one replaceable retainer 114, all of which may couple the display module 102 to the housing 104, as further described below. In the embodiment shown, the housing 104 may contain a battery module 120 that may be coupled to the housing 104 via at least one non-destructively releasable adhesive, as further described below. The battery module 120 may comprise a battery connector that may be retained in a socket with a battery connector retainer 130, as further described below. The housing 104 may also contain at least one port component 140, such as a Universal Serial Bus (USB), that may communicate with external devices and receive electrical power, among other things. As further described below, the at least one port component 140 may be advantageously positioned in the housing 104 via a connector module with an alignment feature. The housing 104 may also comprise an antenna module 150 that may be grounded via a grounding clip 152, as further described below. The housing 104 may comprise at least one molding that is interlocked via at least one cross shaped chamber, as further described below.

Releasable Display Module Retention Assembly

Figure 2A:
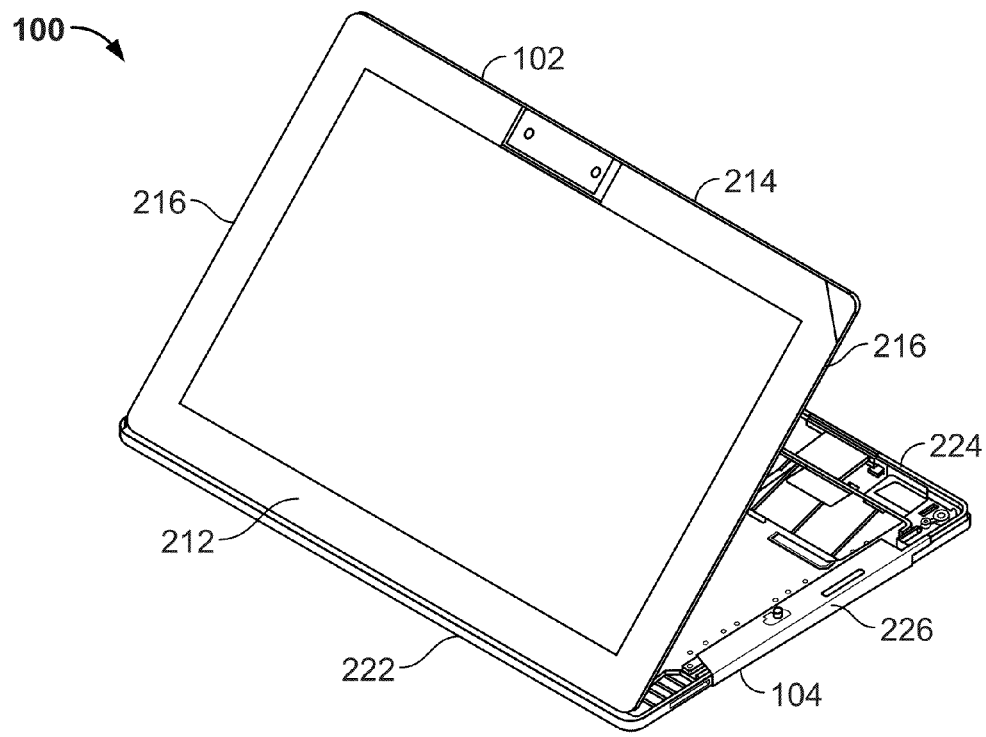
FIGS. 2A-2B illustrate perspective views of an example mobile computing device in accordance with various embodiments of the present invention.
Figure 2B:
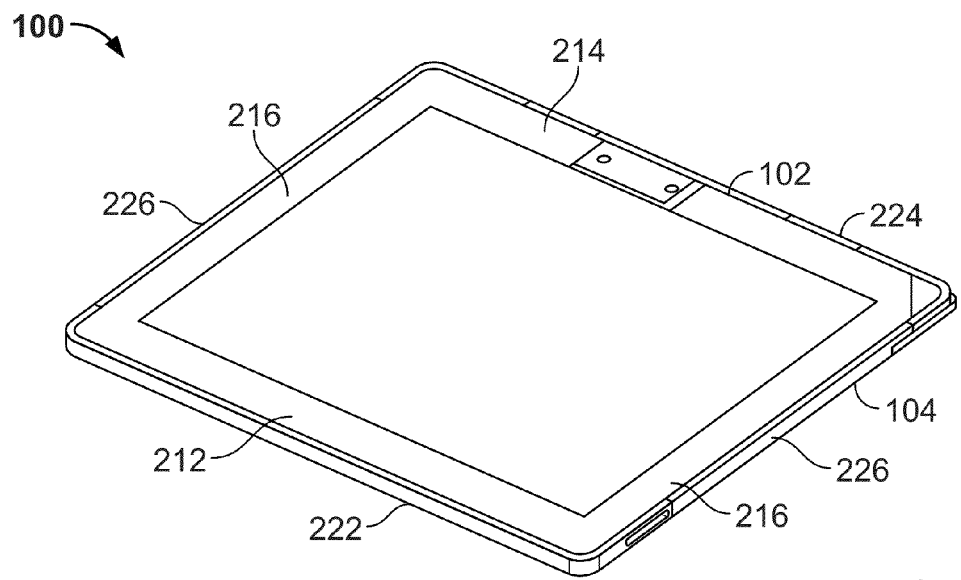
Figure 3A:
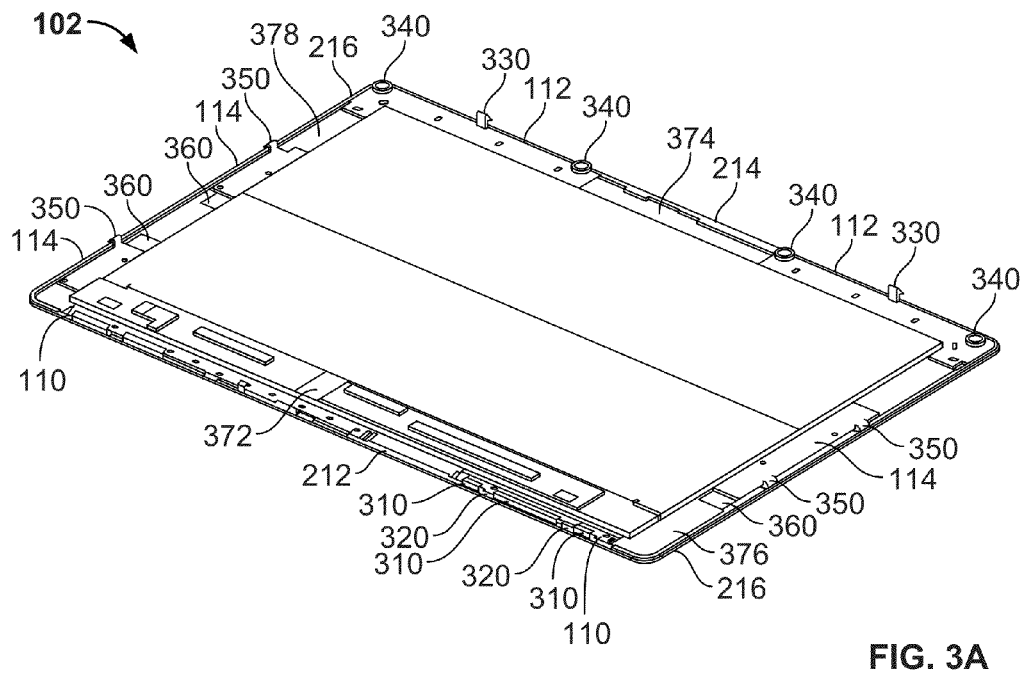
FIGS. 3A-3B illustrate perspective views of an example display module in accordance with various embodiments of the present invention.
Figure 3B:
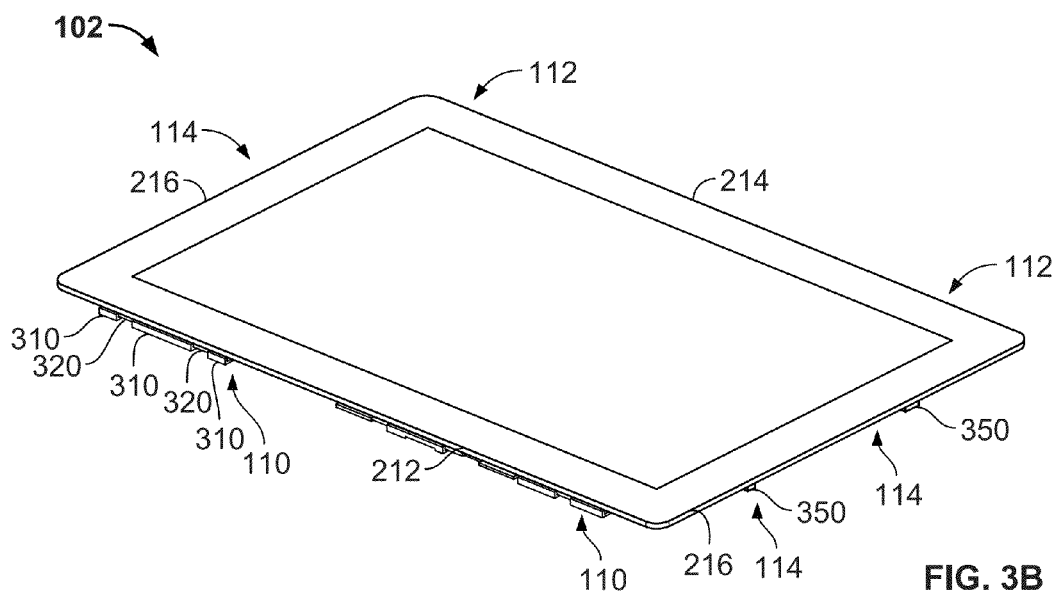
Figure 4A:
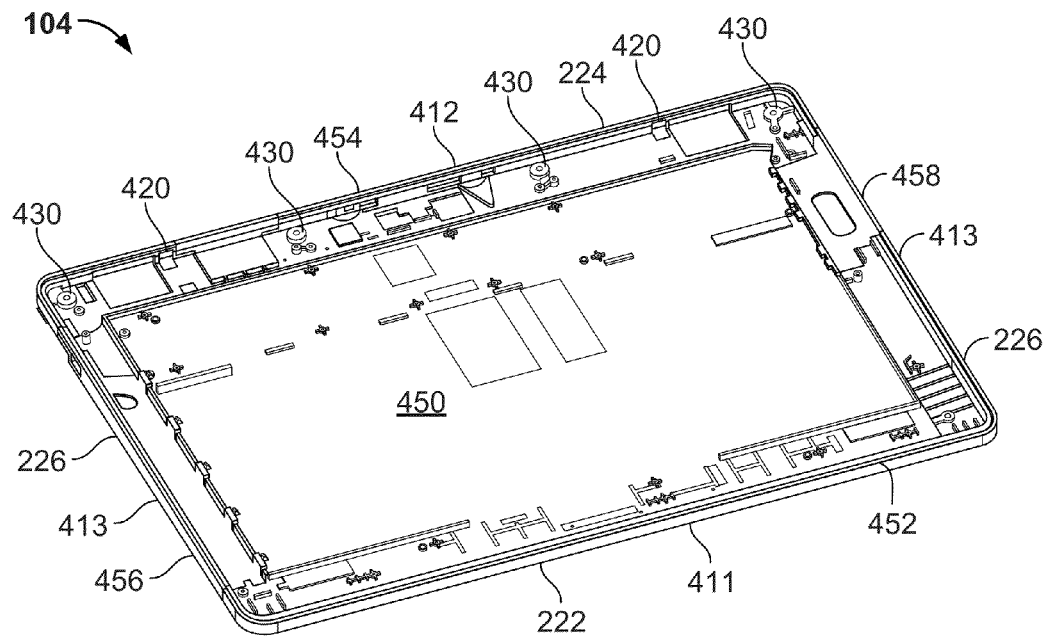
FIGS. 4A-4B illustrate perspective views of an example housing in accordance with various embodiments of the present invention.
Figure 4B:
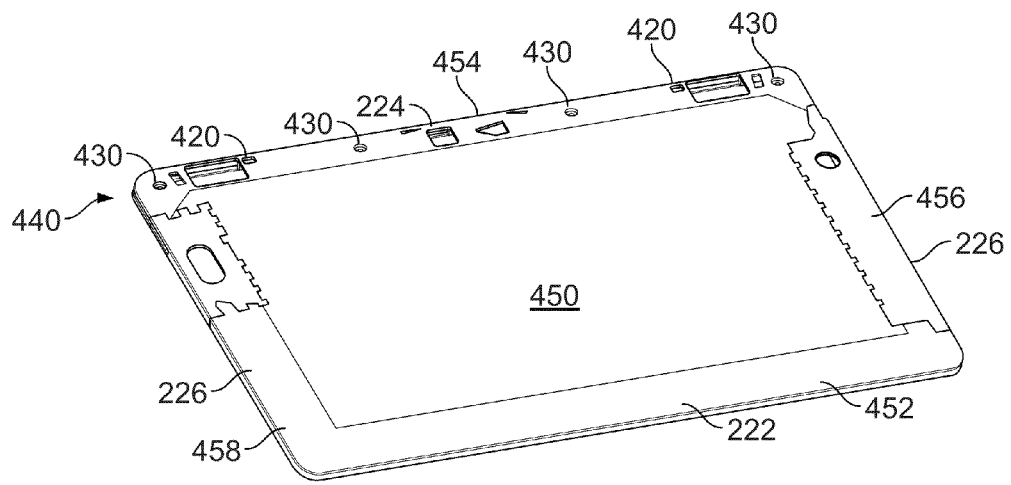

FIGS. 2A-2B illustrate perspective views of an example mobile computing device 100 in accordance with various embodiments of the present invention. FIGS. 3A-3B illustrate perspective views of an example display module 102 of the computing device 100. FIG. 3A shows an exemplary interior side of the display module 102, and FIG. 3B shows an exemplary exterior side of the display module 102. FIGS. 4A-4B illustrate perspective views of an example housing 104 of the computing device 100. FIG. 4A shows an exemplary interior side of the housing 104, and FIG. 4B shows an exemplary exterior side of the housing 104.

The display module 102 may comprise a bottom portion 212, a top portion 214, and two side portions 216, as indicated in FIGS. 2A-2B. The housing 104 may comprise a bottom portion 222, a top portion 224, and two side portions 226, in which each portion of the housing 104 corresponds to the respective portion of the display module 102. It is to be understood that the terms "bottom," "top," and "side," as used herein for clarity and do not necessarily correspond with a physical orientation of the device 100 when in use. As shown in FIG. 2A, the display module 102 is positioned with the housing 104 at approximately a 45 degree angle, with the bottom portion 212 of the display module 102 in contact with the bottom portion 222 of the housing 104, as further described below. As shown in FIG. 2B, the display module 102 is releasably coupled with the housing 104.

A display module 102 may be removably hinged with a housing 104 by two hinge retainers 110 (shown in FIGS. 1 and 3A-3B). A hinge side along the bottom portion 212 of the display module 102 may be positioned in a groove at the bottom portion 222 of the housing 104. After the hinge side is inserted, the top portion 214 of the display module 102 may rotate down to couple with the top portion 224 of the housing 104, effectively locking the bottom of the display module 102 into place, removing the need for screwing or gluing the bottom of the display module 102 to the bottom of the housing 104. As the top of the display module 102 engages the top of the housing 104, two top snap fitting retention clip 330 may engage a lip formed along the top portion 214 (shown in FIG. 4A) on the top portion 224 of the housing 104. These retention clips 330 may hold the display module 102 in place coupled with the housing 104, while two fasteners are driven through the fastener openings 430 in the housing 104 into corresponding fastener receiving bosses 340 in the display module 102 to fixedly fasten the display module 102 to the housing 104, as will be described in greater detail below.

In addition, when the display module 102 is coupled with the housing 104, as shown in FIG. 2B, two side retention clips 350, such as snap fitting latches, along the side portions 216 may engage with lips formed along the respective sides 226 of the housing 104, for example, by having a compression force. Because the top 214 and bottom 212 portions of the display module 102 are securely coupled with the top 224 and bottom 222 portions of the housing 104, if the device 100 experiences a hard impact on a corner or along the top 224 or bottom 222 portions, the display module 102 may bend along the direction of the side portions 216. This bending or bowing of the display module 102 may cause damage to the display module 102 or display panel 103, or cause the top portion 214 of the display module 102 to separate from the top portion 224, thereby decoupling the display module 102 from the housing 104. These side retention clips 350, such as snap fitting latches, may be used to securely couple the sides 216 of the display module 102 to the housing 104, and thereby prevent the display module 102 from bending along the side portions 216. This may help to keep the display module 102 in place during a drop of the mobile computing device 100. Thus, the display module 102 may be tightly held against all four edges of the housing 104.

If it is desired to decouple the display module 102 from the housing 104, the two fasteners may be unfastened, and a low profile tool, such as a flathead screwdriver, can be inserted through retention clip access openings 420 to disengage the two snap fitting retention clips 330 from the lip formed along the top portion 214 of the housing 104. A separating force may be applied to the top portion 224 of the display module 102 to rotate the top portion 224 away from the housing 104, which may disengage the two side snap fitting retention clips. The display module 102 may be rotated to an approximate 45 degree angle to the housing 104, and the display module 102 may then be pulled out and away from the housing 104, which effectively unhinges the display module 102 from the groove at the bottom of the housing 104.

The interior side of the display module 102 shown in FIG. 3A may comprise a bottom interior portion 372, a top interior portion 374, a first side interior portion 376, and a second side interior portion 378. The bottom portion 212 of the display module 102 may comprise at least one hinge retainer 110, which may lock in the bottom portion 212 of the display module 102 against the bottom portion 222 of the housing 104, as shown in FIG. 2. The at least one hinge retainer 110 may comprise a retention bracket 320 and a hook bracket 310. The at least one hinge retainer 110 may be adhered to the display module 102 with an adhesive, e.g., a structural adhesive, such as two-part epoxy. A hinge retainer 110 may be sized and positioned in order to provide clearance for components of the mobile computing device 100, such as a flexible flat cable. Similarly, the size and position of a hook bracket 310 and a retention bracket 320 may also be positioned in order to provide clearance of components.

The top portion 214 of the display module 102 may comprise at least one latch retainer 112, which may retain the top portion 214 of the display module 102 with the top portion 224 of the housing 104, as shown in FIGS. 2A-2B. In one embodiment, the at least one latch retainer 112 is located on the opposite side from the at least one hinge retainer 110. The at least one latch retainer 112 may comprise at least one top retention clip 330 and at least one fastener receiving boss 340. The at least one latch retainer 112 may be adhered to the display module 102 with an adhesive, e.g., a structural adhesive, such as a two-part epoxy. A latch retainer 112 may be sized and positioned in order to provide clearance for components of the mobile computing device 100. The size and position of the at least one top retention clip 330 and the at least one fastener receiving boss 340 may also be positioned in order to provide clearance of components. As described further below, the at least one fastener receiving boss 340 may be hollow and may comprise an internal thread to accept at least a portion of a shank of a screw that comprises an external thread.

One or both of the side portions 216 of the display module 102 may include at least one replaceable retainer 114, which may retain the side portion 216 of the display module 102 with the respective side portion 226 of the housing 104. In one embodiment, the at least one replaceable retainer 114 is located along an edge of the display module 102 between the at least one hinge retainer 110 and the at least one latch retainer 112. The at least one replaceable retainer 114 may comprise at least one side retention clip 350. The at least one replaceable retainer 114 may be adhered to the display module 102 with a non-destructively releasable adhesive, such as, for example, a stretch releasing double-sided adhesive tape, which may comprise a non-adhesive pull tab 360. As further described below, pulling the non-adhesive pull tab 360 may stretch the tape in the bond plane, which may cause the tape to release its bond with at least one of the at least one of the replaceable retainer 114 and the display module 102. A replaceable retainer 114 may be sized and positioned in order to provide clearance for components of the mobile computing device 100. The size and position of the at least one side retention clip may also be positioned in order to provide clearance of components.

As shown in FIGS. 4A-4B, the housing 104 may comprise a base 450, a bottom wall portion 452, a top wall portion 454, a first side wall portion 456, and a second side wall portion 458. In some embodiments, the housing 104 may be rectangular shaped such that the first side wall portion 456 and the second side wall portion 458 may be each located between the bottom wall portion 452 and the top wall portion 454, and may be each orthogonal to the bottom wall portion 452 and the top wall portion 454. In some embodiments, a housing may be comprised of magnesium alloy and fiber-reinforced plastic. The bottom wall portion 452 of the housing 104 may comprise a bottom rim 411. As described further below, the bottom rim 411 may comprise a bottom lip forming a groove within which a hook bracket 310 or a retention bracket 320 of a hinge retainer 110 may be inserted.

The top wall portion 454 of the housing 104 may comprise a top rim 412. As described further below, the top rim 412 may comprise a top lip or ledge that may engage a top retention clip 330 of a latch retainer 112. As described further below, the top portion 224 of the housing 104 may also comprise at least one retention clip access opening 420 through which the at least one top retention clip 330 may be accessed with a tool so as to disengage the top retention clip 330 from the lip along the top rim 412. As described further below, the top portion 224 of the housing 104 may also comprise at least one fastener opening 430 that receives a fastener, such as a screw. The fastener opening 430, which may be shaped in the form of a boss, may be sized to accept a tail end of a fastener, such as a screw shank, and may be sized to prevent a head and of a fastener, such as a screw head, from passing through the fastener opening 430. The fastener opening 430 may be positioned in alignment with the fastener receiving boss 340 when the display module 102 is coupled to the housing 104, as shown in FIG. 2B. Such adjacent positioning may permit portions of a screw shank with an external thread to pass through the fastener opening 430 and engage an internal thread of a respective fastener receiving boss 340.

Each side wall portion 456, 458 of the housing 104 may comprise a respective side rim 413. As described further below, the side rim 413 may comprise a side lip or ledge that may engage a side retention clip 350 of a replaceable retainer 114 at a contact surface of the side lip. According to one embodiment, in contrast to the top portion 224 of the housing 104, there is no retention clip access opening through which the at least one side retention clip 350 may be disengaged. Under this embodiment, the side retention clip 350 may be designed so that the side retention clip 350 is disengaged when a force separates the display module 102 from the housing 104. Although such disengagement of the side retention clip 350 from the side lip may cause the side retention clip 350 to break or lose at least a part of its retaining functionality, under this embodiment, the replaceable retainer 114 would be replaced with a new replaceable retainer 114, as further described below.

As shown in FIG. 4B, the top portion 224 of the housing 104 comprises a decorative band cover recess 440, which may hold a decorative band cover (not shown). The decorative band cover may provide protection of the retention clip access opening 420 and the fastener opening 430 and improve the aesthetics of the device 100 by covering the mechanical structures used for coupling the display module 102 to the housing 104.

Figure 5A:
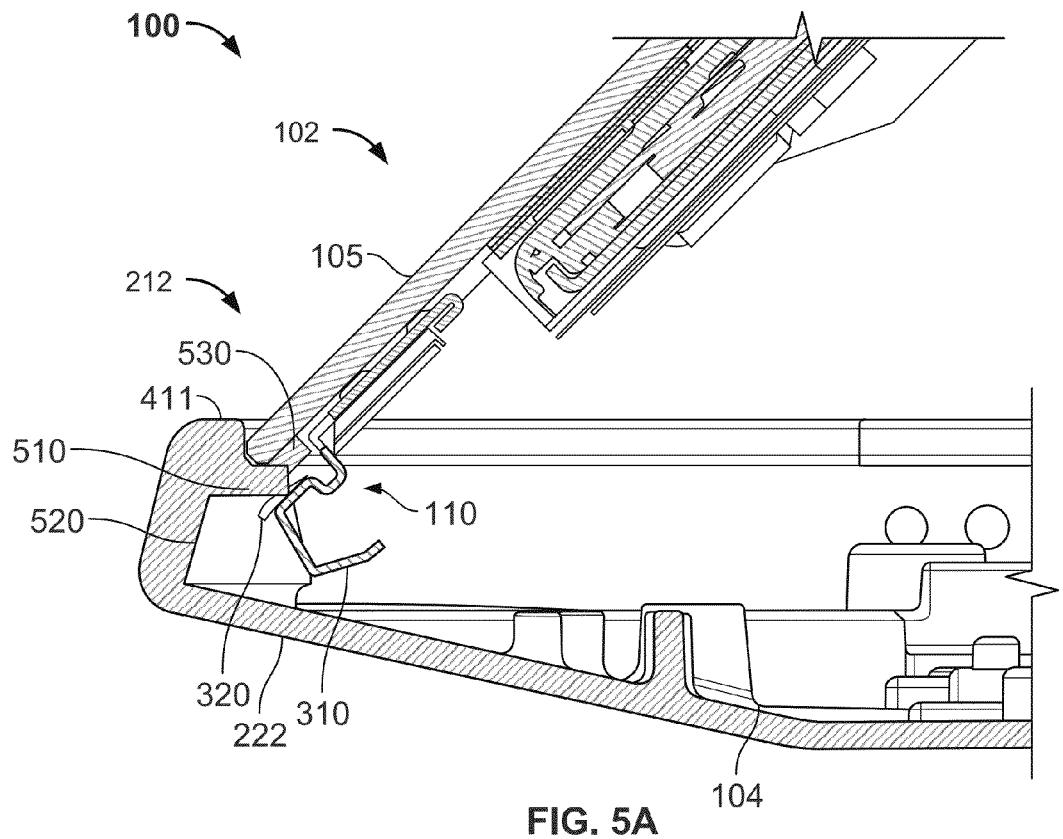
FIGS. 5A-5D illustrate cross-sectional views of the engagement of the bottom portions of an example mobile computing device in accordance with various embodiments of the present invention.
Figure 5B:
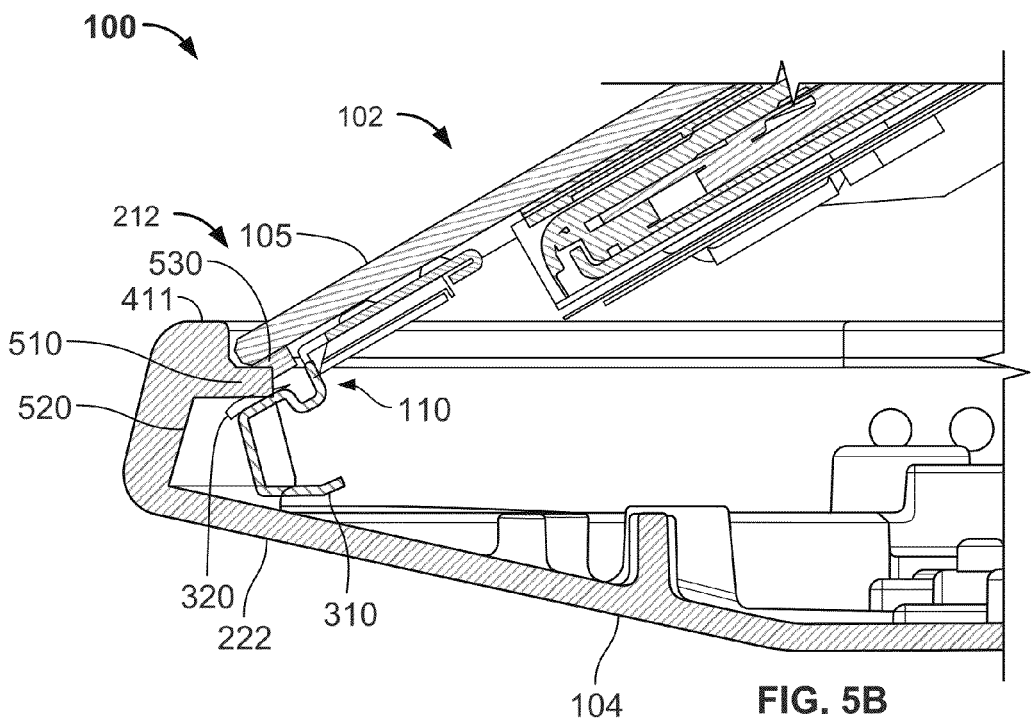
Figure 5C:
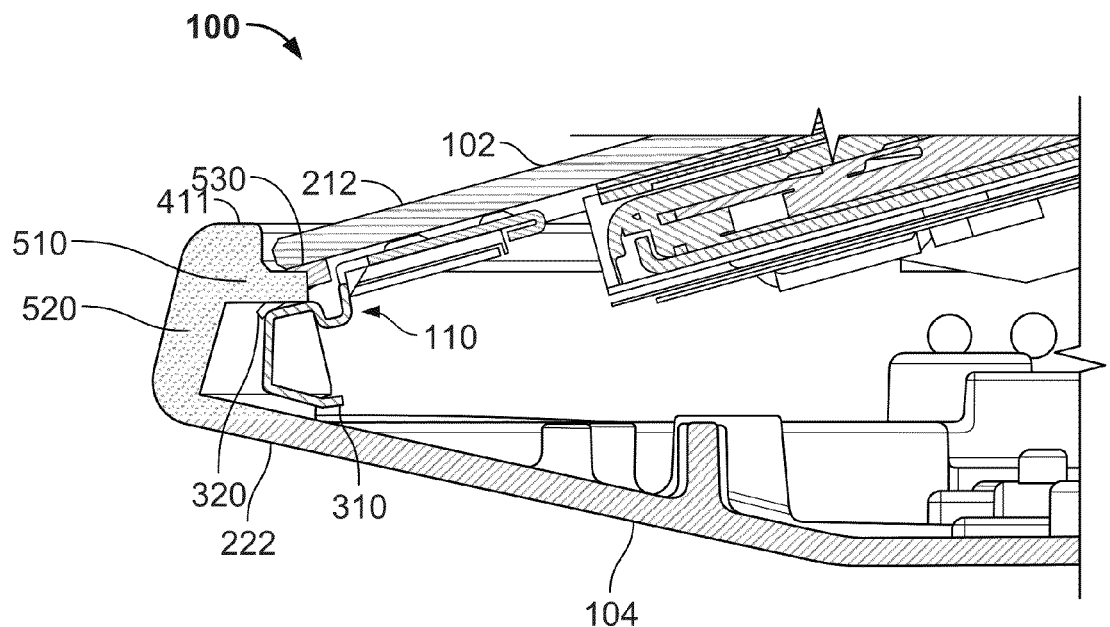
Figure 5D:
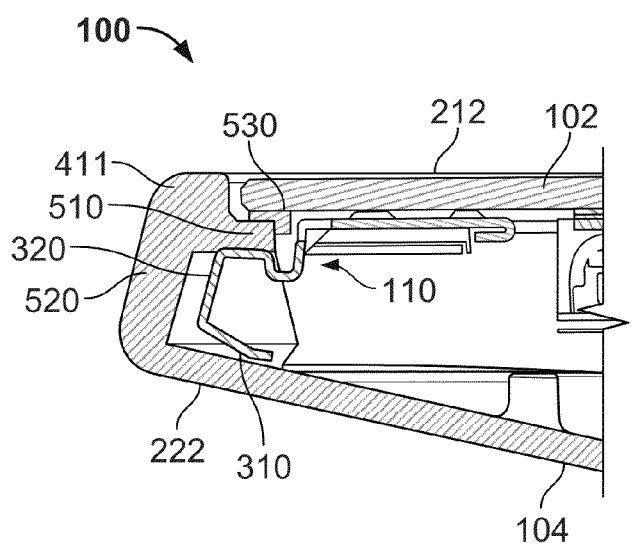

FIGS. 5A-5D illustrate cross-sectional views of the engagement of the bottom portion 212 of an example mobile computing device 100 in accordance with various embodiments of the present invention. FIG. 5A shows the display module 102 at an approximate 45 degree angle to the housing 104, as also shown in FIG. 2A. FIG. 5B shows the display module 102 at an approximate 30 degree angle to the housing 104. FIG. 5C shows the display module 102 at an approximate 15 degree angle to the housing 104. FIG. 5D shows the display module 102 at an approximate coupled position to the housing 104, as also shown in FIG. 2B.

According to an embodiment, the bottom portion 212 of the display module 102 is positioned adjacent to the bottom rim 411 of the bottom portion 222 of the housing 104. The bottom portion 212 of the display module 102 may rest upon a bottom lip 510 of the bottom rim 411 of the housing 104. The bottom lip 510 may be substantially parallel to the bottom rim 411 and to the base 450 of the housing 104. In some embodiments, a dust seal 530 may be positioned in between the display module 102 and the bottom lip 510. The dust seal 530 may comprise a foam pad and may be adhered to the inside circumferential edge of the display module 102 with pressure sensitive adhesive.

A hinge retainer 110 may be adhered to the display module 102, and a groove 520 formed by the bottom lip 510 and the housing 104. A retention bracket 320 may initiate insertion into the groove 520. For example, as shown in FIG. 5A, in some embodiments, the retention bracket 320 may extend at a distal end beyond the hook bracket 310, which may provide guidance underneath the bottom lip 510. In some embodiments, a retention bracket 320 may engage an upper contact surface of the groove 520, for example, at the bottom lip 510. In some embodiments, a hook bracket 310 may be inserted into the groove 520.

Figure 6C:
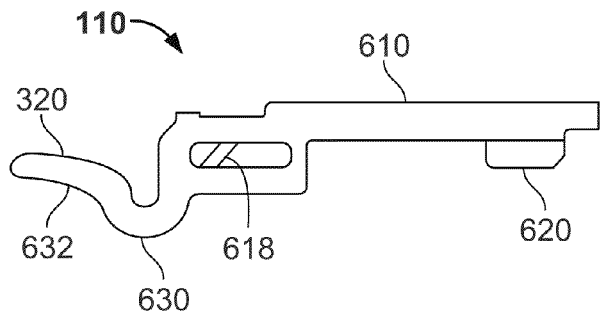
Figure 6D:
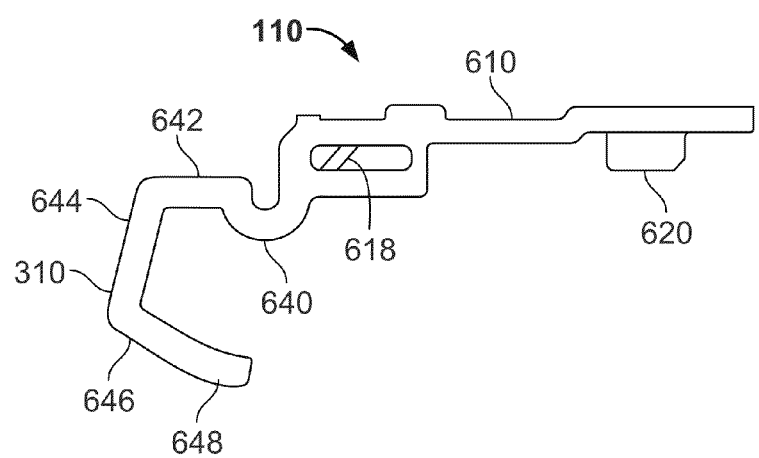

FIGS. 6A-6D illustrate a hinge retainer 110 in accordance with various embodiments of the present invention. A hinge retainer 110 is shown in FIG. 6A as a top view, in FIG. 6B as a front view, in FIG. 6C as a cross-sectional view including a retention bracket 320, and in FIG. 6D as a cross-sectional view including a hook bracket 310.

A hinge retainer 110 may be comprised of a stainless steel material, and may be deburred through sandblasting, which may provide the hinge retainer 110 with texture to create more surface area for adhesion. A hinge retainer 110 may comprise a hinge retainer body 610 having a top edge 612, two side edges 614, and a bottom edge 616. The top edge 612 may comprise a top hem 652, and a side edge 614 may comprise a side hem 654. A hem may comprise a portion of the hinge retainer body 610 folded over to provide extra strength and rigidity. At least one hook bracket 310 and at least one retention bracket 320 may be located at the bottom edge 616 of the hinge retainer body 610. A gusset 618 may support at least one of a hook bracket 310 and a retention bracket 320. A gusset 618 may be placed at a 45 degree angle from the hinge retainer body, and may provide at least one of strength and stiffness to a respective hook bracket 310 and retention bracket 320.

A hinge retainer 110 may be adhered to a display module 102 with an adhesive, such as two-part epoxy. Under one embodiment, a hinge retainer body 610 may have at least one standoff 620 that creates a space beneath the hinge retainer body 610 for the epoxy. The standoff 620 may be an indentation of the hinge retainer body 610 that acts as a support for the hinge retainer body 610. The hinge retainer body 610 may include at least one hole through which an adhesive, such as two-part epoxy, may pass and form a rivet, such as when the adhesive at a distal end is larger than the hole through which the adhesive passed forming, for example, an anchor. In some embodiments, a hinge retainer body 610 may include a plate rivet hole 622 and a bottom edge rivet hole 624.

A retention bracket 320 may comprise a retention spring 630 and a shelf 632 attached to the retention spring 630. The retention spring 630 may enable the shelf 632 to conform to an upper contact surface of a groove 520, such as formed with a bottom lip 510 of a housing 104. The shelf 632 is sized to grip against the bottom lip 510 when the display module 102 is coupled to the housing 104, as depicted in FIG. 5D. In some embodiments, portions of the shelf 632 of the retention bracket 320 may extend to the upper contact surface of the groove 520, thereby exerting a spring force against the upper contact surface of the groove 520. In some embodiments, the spring force of the shelf 632 may pull the display 102 against the housing 104. In some embodiments, the spring force of the shelf 632 may compress the dust seal 530 of the display 102.

A hook bracket 310 may comprise a hook spring 640 and a shank 642 attached to the hook spring 640. Similar to the retention spring 630 and the shelf 632 of the retention bracket 320, the hook spring 640 may enable the shank 642 to conform to an upper contact surface of a groove 520, such as formed with a bottom lip 510 of the housing 104. The shank 642 is sized to grip against the bottom lip 510 when the display module 102 is coupled to the housing 104, as depicted in FIG. 5D. In some embodiments, the shelf 632 of the retention bracket 320 may exert a greater spring force than the shank 642 of the hook bracket 310. For example, portions of the shelf 632 may extend closer to the upper contact surface of the groove 520 than portions of the shank 642. Attached to the shelf 642 is a bend 644. Attached to the bend 644 is a throat 646, and at the distal end of the throat 646 is a bumper 648. As depicted in FIG. 5D, a bumper 648 may be proximate the lower contact surface of the groove 520. In alternative embodiments, a bumper 648 may engage or touch the lower contact surface of the groove 520. In some embodiments, a bumper 648, when proximate or engaged with the housing 104, may keep the display module 102 from rotating due to a drop of the mobile computing device 100. In some embodiments, a bumper 648, when proximate or engaged with the housing 104, may keep the display module 102 from shifting, and thus help maintain the integrity of the bond between the display 102 and the housing 104. In some embodiments, a hook bracket 310 may be advantageous to prevent the hinge retainer 110 from peeling off of the display module 102. In some embodiments, a hook bracket 310 may be advantageous to increase rigidity of the hinge retainer 110.

As can be seen in FIGS. 6A and 6B, the hook brackets 310 and retention brackets 320 may have a size and position to promote clearance of components of the mobile computing device 100. In some embodiments, a hook bracket 310 may have portions that do not include a bumper 648. In some embodiments, a hook bracket 310 may have portions that do not include a throat 646, or may include a shortened throat 646. In some embodiments, a hook bracket 310 may have portions that do not include a bend 644, or may include a shortened band 644. These variances of portions of a hook bracket 310 may, for example, promote clearance of components of the mobile computing device 100, while still maintaining the benefits of the hook bracket 310.

Figure 7:
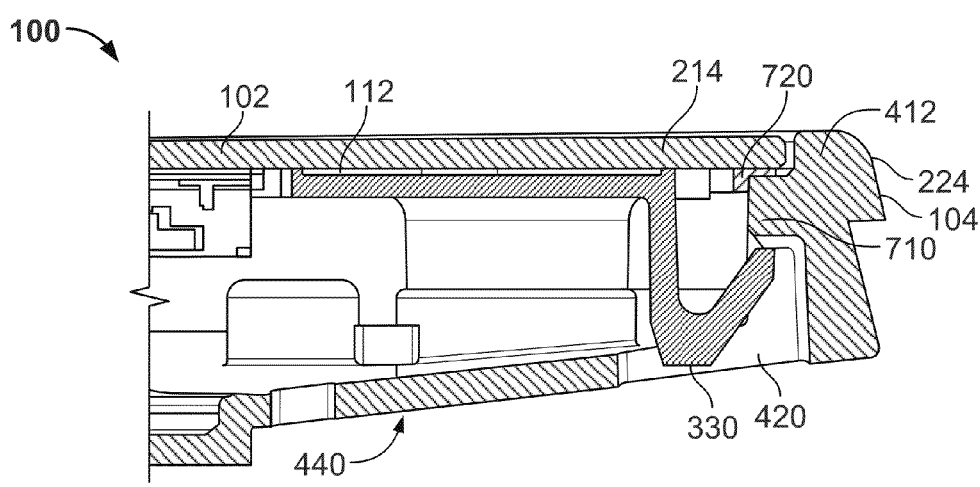
FIG. 7 illustrates a cross-sectional view of an engagement of the top portion of a display module with a housing of an example mobile computing device in accordance with various embodiments of the present invention.

FIG. 7 illustrates a cross-sectional view of an engagement of the top portion 214 of the display module 102 with the housing 104 of an example mobile computing device 100 in accordance with various embodiments of the present invention. As shown in FIG. 7, a display module 102 is coupled to a housing 104, as shown in FIG. 2B. According to an embodiment of the invention, the top portion 214 of the display module 102 may be adjacent to a top rim 412 of the housing 104 and may rest upon a top lip 710 of the top portion 224 of the housing 104. The top lip 710 may be substantially parallel to the top rim 412 of the housing 104. In some embodiments, a dust seal 720 may be positioned in between the display module 102 and the top lip 710.

A latch retainer 112 may be adhered to the display module 102. In some embodiments, a latch retainer 112 may comprise a thermoplastic material. A top retention clip 330 of the latch retainer 112 may engage a top lip 710 of the housing 104 at a contact surface of the top lip 710. The top retention clip 330 may be accessed via the retention clip access opening 420 of the housing 104. Accordingly, the top retention clip 330 may be compressed and disengaged from the top lip 710. A retention clip access opening 420 may be adjacent a decorative band recess 440.

Figure 8:
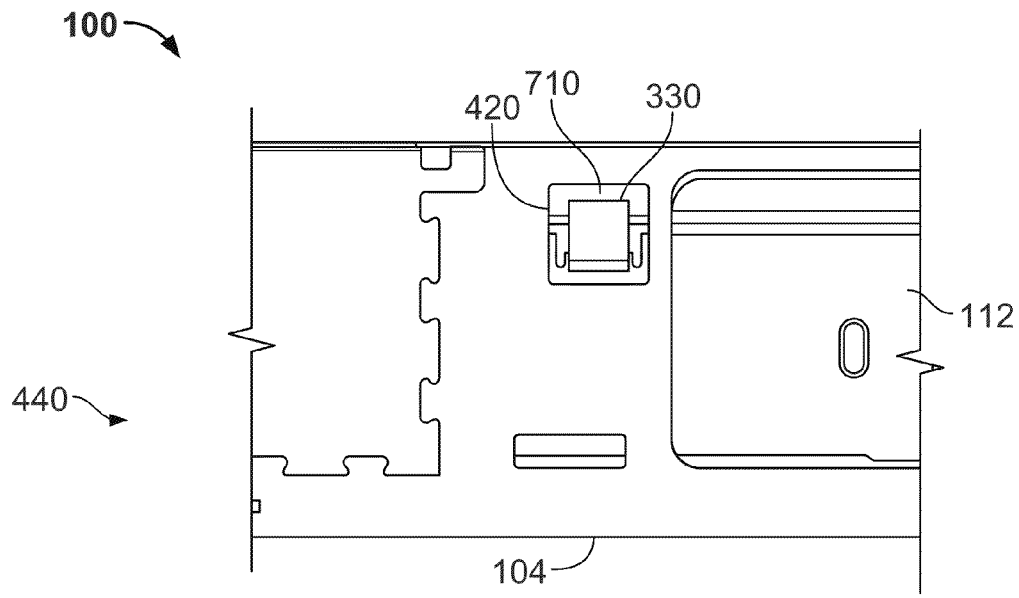
FIG. 8 illustrates a top view of a retention clip access opening in a housing of an example mobile computing device in accordance with various embodiments of the present invention.

FIG. 8 illustrates an enlarged top view of a retention clip access opening 420 in the housing 104 of an example mobile computing device 100 in accordance with various embodiments of the present invention. FIG. 8 shows a top view of a decorative band recess 440 and a retention clip access opening 420 of a housing 104. Through the retention clip access opening 420, a top retention clip 330 is shown engaged with a top lip 710. The top retention clip 330 may be disengaged from the top lip 710 by coaxing at least a portion of the top retention clip 330 away from the top lip 710. Under one embodiment, a latch retainer 112 is shown through a hole of the housing 104.

Figure 9:
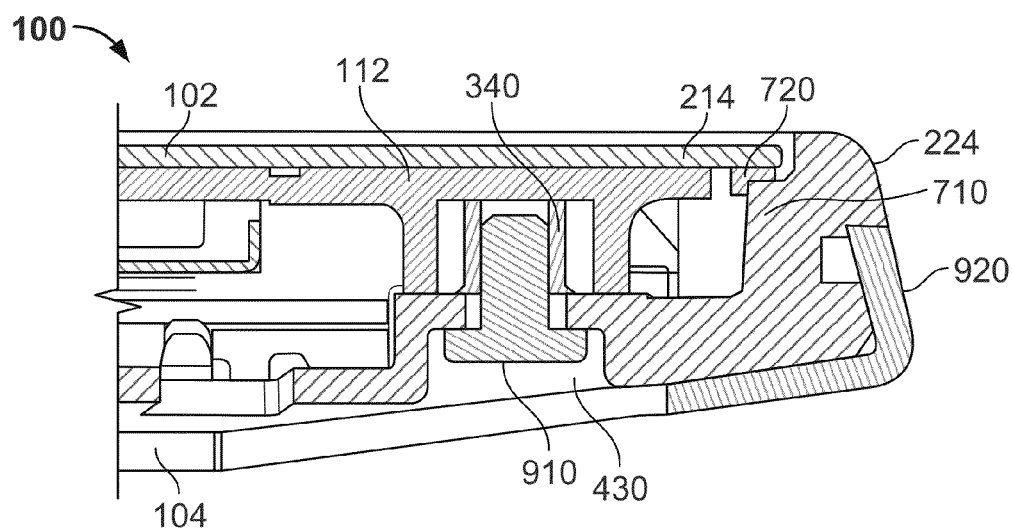
FIG. 9 illustrates a cross-sectional view of an enlarged cross-sectional view of a latch retainer of an example mobile computing device in accordance with various embodiments of the present invention.

FIG. 9 illustrates an enlarged cross-sectional view of a latch retainer 112 of an example mobile computing device 100 in accordance with various embodiments of the present invention. As shown in FIG. 9, a display module 102 is coupled to a housing 104, as shown in FIG. 2B. According to an embodiment of the invention, the top portion 214 of the display module 102 may be adjacent to a top rim 412 of the housing 104 and may rest upon a top lip 710 of the top portion 224 of the housing 104. In some embodiments a dust seal 720 may be positioned in between the display module 102 and the top lip 710.

A latch retainer 112 may be adhered to the display module 102. A portion of a tail end of a screw 910 may be placed through a fastener opening 430 of the housing 104 until the fastener opening 430 engages a portion of a head end of the screw 910. A portion of the tail end of the screw 910 may engage the fastener receiving boss 340 via external threads of the screw 910 and internal threads of the fastener receiving boss 340. In some embodiments, a fastener receiving boss 340 may be comprised, for example, of a brass alloy, and materials of the latch retainer 112 may be insert-molded around a portion of the fastener receiving boss. A decorative band cover 920 may be placed within the decorative band recess 440 to provide, for example, protection to the screw 910 and the top retention clip 330.

Figure 10A:
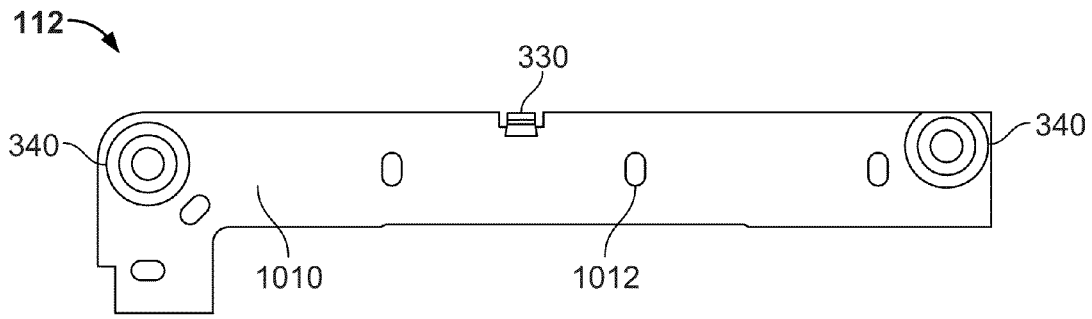
FIGS. 10A-10D illustrate a latch retainer in accordance with various embodiments of the present invention.
Figure 10B:
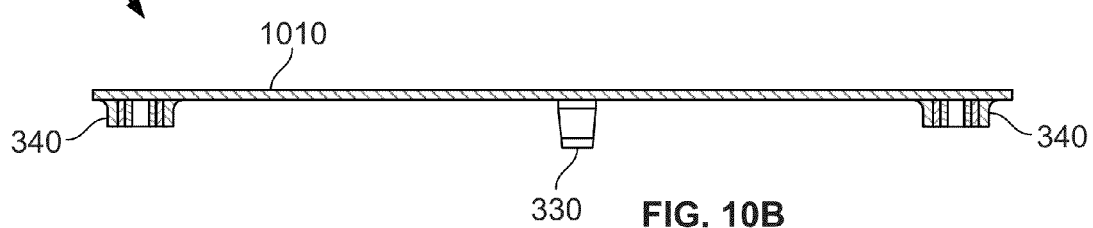
Figure 10C:
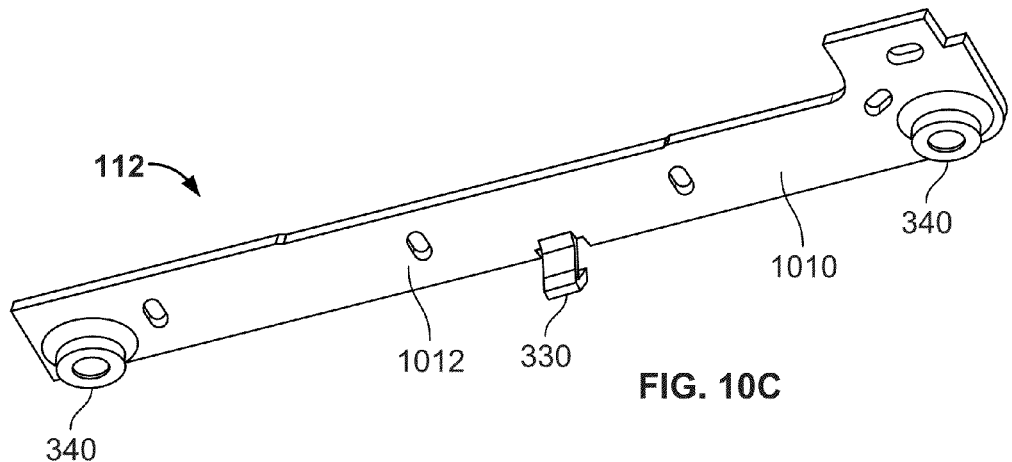
Figure 10D:
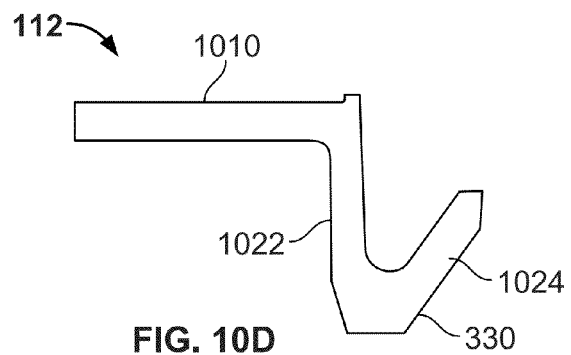

FIGS. 10A-10D illustrate a latch retainer 112 in accordance with various embodiments of the present invention. A latch retainer 112 is shown in FIG. 10A as a top view, in FIG. 10B as a front view, in FIG. 10C as a perspective view, and in FIG. 10D as a cross-sectional view including a top retention clip 330. A latch retainer 112 may comprise a latch retainer body 1010, at least one top retention clip 330 protruding from the latch retainer body 1010 and aligned with a retention clip access opening 420 of a housing 104, and at least one fastener receiving boss 340 protruding from the latch retainer body 1010 and aligned with a fastener opening 430 of a housing 104. A latch retainer 112 may be adhered to a display module 102 with an adhesive, such as two-part epoxy. Under one embodiment, a latch retainer body 1010 may include at least one hole 1012 through which epoxy may pass and form a rivet. Under one embodiment, the latch retainer body 1010 may be comprised of a plastic material.

A top retention clip 330 may comprise a cantilever 1022 and a catch 1024 attached to the cantilever 1022. The cantilever 1022 and the catch 1024 may comprise a flexible material, such as plastic, that can be flexed as it is engaged and disengaged with a top lip 710 of the housing 104.

FIG. 11 illustrates a cross-sectional view of an example mobile computing device 100 in accordance with various embodiments of the present invention. As shown in FIG. 11, a display module 102 is coupled to a housing 104, as shown in FIG. 2B. According to an embodiment of the invention, the side portion 216 of the display module 102 may be adjacent to a side rim 413 of the housing 104 and may rest upon a side lip 1110 of the side portion 226 of the housing 104. The side lip 1110 may be substantially parallel to the side rim 413 of the housing 104. In some embodiments, a dust seal 1130 may be positioned in between the display module 102 and the side lip 1110.

A replaceable retainer 114 may be adhered to the display module 102 with a non-destructively releasable adhesive, e.g., stretch releasing double-sided adhesive tape 1120. A side retention clip 350 of the replaceable retainer 114 may engage a side lip 1110 of the housing 104. In some embodiments, a replaceable retainer 114 may comprise a polycarbonate material.

FIG. 12 illustrates a top view of a side portion 216 of an example display module 102 in accordance with various embodiments of the present invention. A stretch releasing double-sided adhesive tape 1120 may be adhered to a side portion 216 of the display module 102 by applying pressure. In some embodiments, the tape is pressure sensitive such that a bond is formed when pressure is applied to the tape and an adherend. In some embodiments, the stretch releasing double-sided tape 1120 may include a hole 1210. In one embodiment, the length of the stretch releasing double-sided tape 1120 may be longer than the length of the replaceable retainer 1114. Accordingly a double-sided adhesive portion of the double-sided adhesive may reside beneath the replaceable retainer 1114 and a non-adhesive pull tab 360 of the stretch releasing double-sided tape 1120 may be exposed.

A stretch releasing double-sided adhesive tape 1120 may have a thickness of approximately 0.25 millimeters and may comprise a backing and two opposing adhesive layers placed on opposing surfaces of the backing. The backing may comprise a film layer. A film layer may comprise a polymeric film such as polyethylene and polypropylene film or a polymeric foam such as polyolefin foam. An adhesive layer may comprise a pressure sensitive adhesive, such as synthetic rubber, acrylic or the like. Examples of stretch releasing double-sided adhesive tape are VHB 5906 from Minnesota Mining and Manufacturing Company and Tesa 70425 from Biersdorf AG. Stretch releasing double-sided adhesive tape 1120 may be advantageous because of its sheer strength. Stretch releasing double-sided adhesive tape 1120 may be removed from an adherend by stretching the tape lengthwise in a direction approximately parallel to the adherend. For example, by pulling on the non-adhesive pull tab 360, the stretch releasing double-sided adhesive tape 1120 may be cleanly removed from the display module 102, which may release the replaceable retainer 114. A new replaceable retainer 114 may then be adhered to the display module 102. Such may be advantageous because, after a side retention clip 350 is forcibly disengaged from a side lip 1110, the side retention clip 350 may lose a portion of its engagement properties or may break. Accordingly, rather than reengaging an old side retention clip 350, a new side retention clip 350 of a new replaceable retainer 114 may be engaged with a side lip 1110.

Figure 13A:
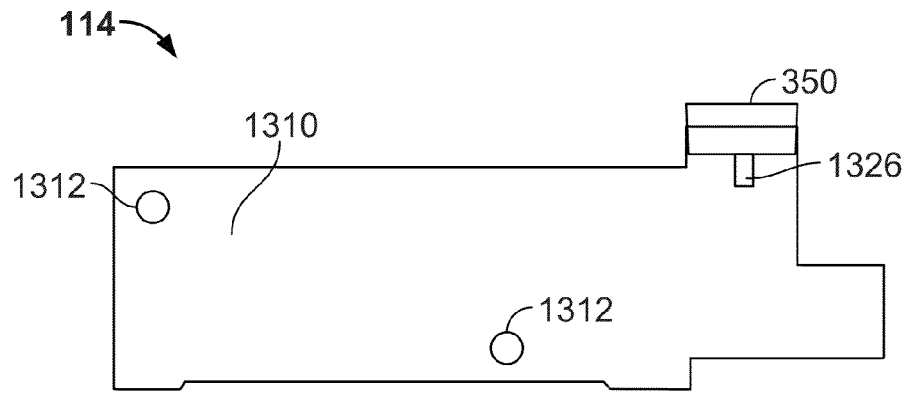
FIGS. 13A-13D illustrate a replaceable retainer in accordance with various embodiments of the present invention.
Figure 13B:
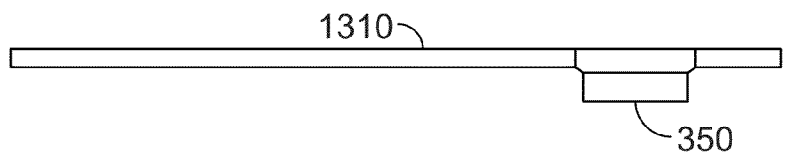
Figure 13C:
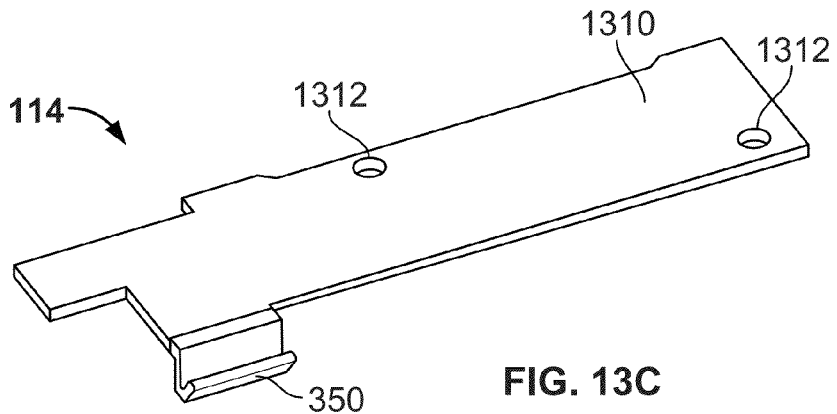
Figure 13D:
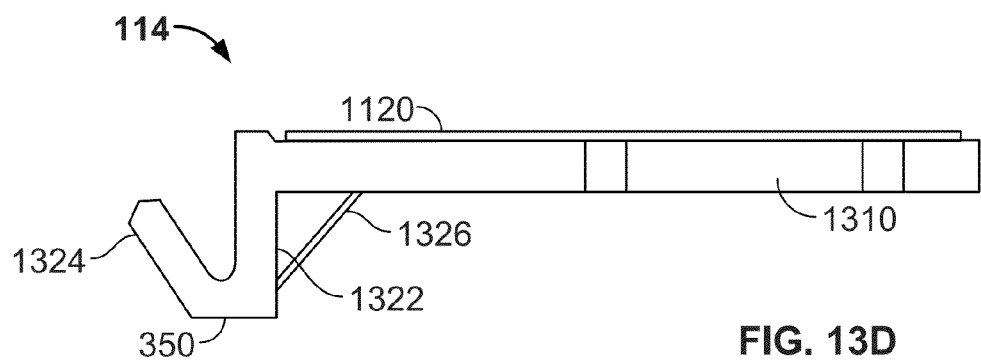

FIGS. 13A-13D illustrate a replaceable retainer 114 in accordance with various embodiments of the present invention. A replaceable retainer 114 is shown in FIG. 13A as a top view, in FIG. 13B as a front view, in FIG. 13C as a perspective view, and in FIG. 13D as a cross-sectional view including a side retention clip 350. A replaceable retainer 114 may comprise a replaceable retainer body 1310, and at least one side retention clip 350 protruding from the replaceable retainer body 1310. Under one embodiment, the replaceable retainer body 1310 may be comprised of a plastic material. As described above, a replaceable retainer 114 may be adhered to a display module 102 with a stretch releasing double-sided adhesive tape 1120 that includes a non-adhesive pull tab 360.

A side retention clip 350 may comprise a cantilever 1322 and a catch 1324 attached to the cantilever 1322. The cantilever 1322 and the catch 1324 may comprise a flexible material, such as plastic, that can be flexed as it is engaged and disengaged with a side lip 1110 of the housing 104. A gusset 1326, attached to the cantilever 1322 and the replaceable retainer body 1310, may provide additional strength and support to the side retention clip 350. One or more alignment holes 1312 may align the replaceable retainer 114 when it is adhered, for example, to the glass of a display module 102 via a fixture with pins that correspond to the one or more alignment holes 1312.

Removable Battery Assembly

Figure 14A:
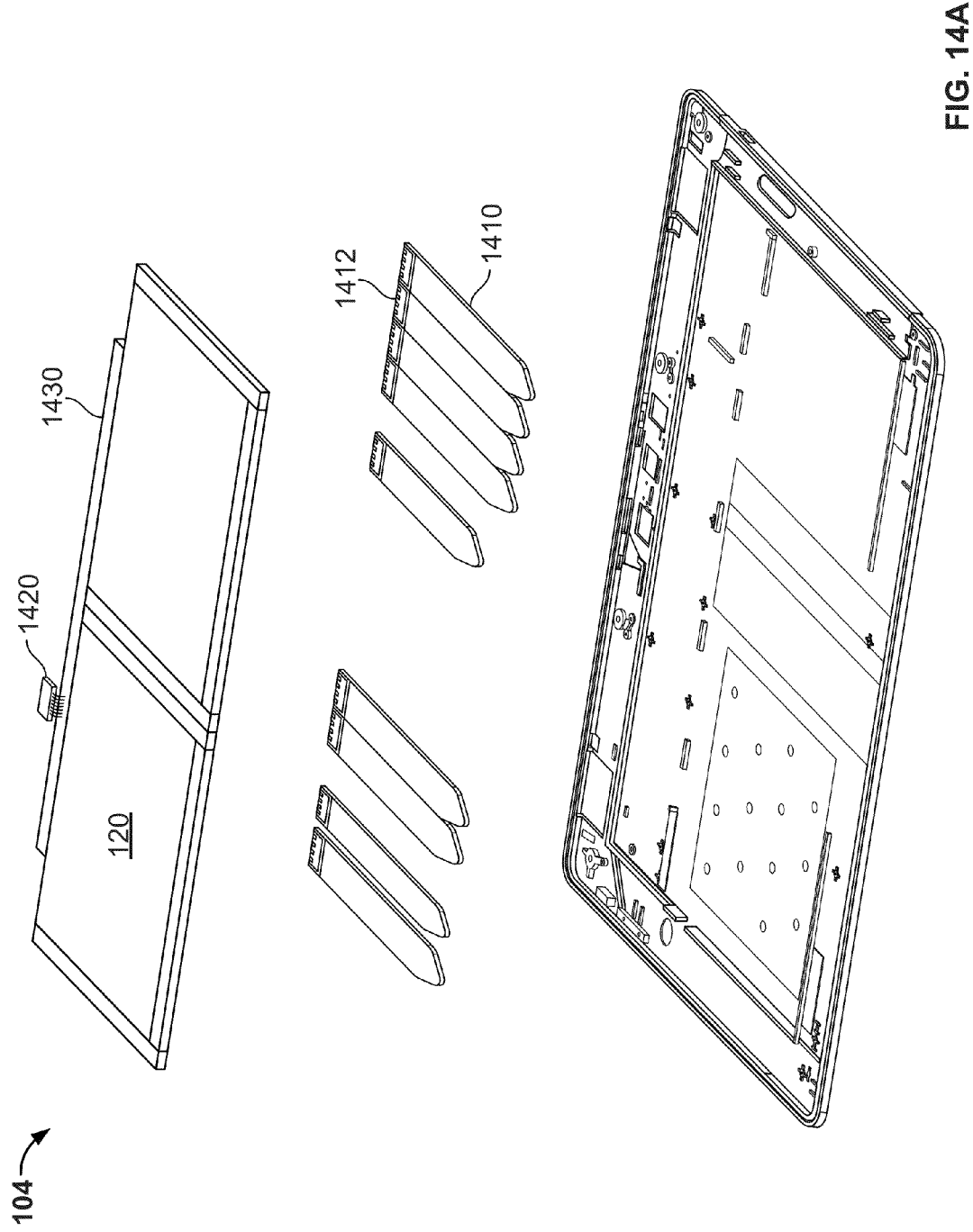
FIGS. 14A-14B illustrate a housing in accordance with various embodiments of the present invention.
Figure 14B:
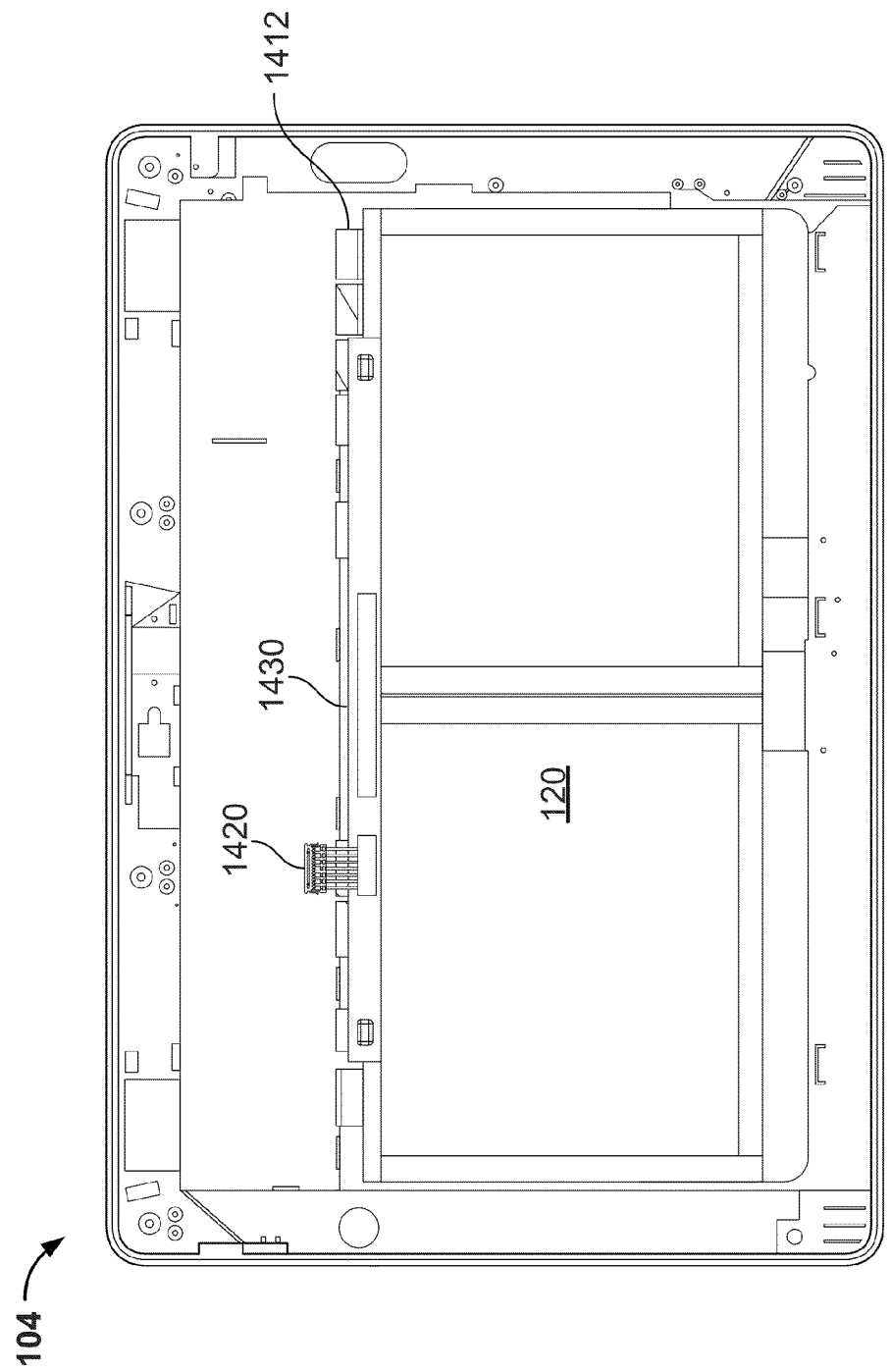

FIGS. 14A-14B illustrate a housing 104 in accordance with various embodiments of the present invention. In many mobile computing devices, such as smartphones or tablet computers, the battery module is one of the heaviest components in the device, and when the device experiences an impact, the battery module has a tendency to shift in position if not properly secured within the housing of the device. A battery module 120 may comprise a battery printed circuit board (PCB) 1430. A battery module 120 may further comprise one or more battery cells, such as, e.g., two cells, and a battery PCB 1430 may couple a plurality of battery cells together. A battery module may have dimensions of approximately 195.6 millimeters long, 80.7 millimeters wide, and 3.11 millimeters high, and may have a weight of approximately 100.8 grams. In accordance with embodiments of the present invention, the battery module 120 may be adhered to the housing 104 with stretch releasing double-sided adhesive strips 1410, providing a strong and significant bond that prevents the battery module 120 from decoupling due to a drop of a mobile computing device 100. Despite the strong bond, the battery module is removable and replaceable because the stretch releasing double-sided adhesive strips may be stretched in order to remove the battery module 120 from the housing 104. Accordingly, the battery module does not need to be glued or soldered to the housing 104, and the problem of damaging the housing 104 or the battery module 120 during removal of the glued or soldered battery module 120 is avoided.

As illustrated in the exploded view of FIG. 14A, at least one battery module 120 may be adhered to the housing 104 via at least one respective stretch releasing double-sided adhesive strip 1410. In some embodiments, a battery is adhered to a housing 104 with a plurality of strips, which may, for example, facilitate removal of each strip. In some embodiments, each strip may have a tapered end that is opposite from a non-adhesive pull tab 1412, which may, for example, facilitate removal of each strip. For example, as illustrated in FIGS. 14A-14B, nine stretch releasing double-sided adhesive strips 1410 with tapered ends may adhere a battery module 120 to the housing 104. Under one embodiment, a battery module 120 is adhered to the housing 104 via at least four stretch releasing double-sided adhesive strips 1410, and each stretch releasing double-sided adhesive strip may have a length that is comparable to the length of the battery module 120. Under another embodiment, a battery module 120 is adhered to a housing 104 via a single stretch releasing double-sided adhesive strip 1410 with a length and height that is respectively comparable to the length and height of the battery module 120. The at least one battery may comprise a battery connector 1420 to electrically connect the at least one battery module 120 to a component of the mobile computing device 100. Each stretch releasing double-sided adhesive strip 1410 may be the same size or a different size from another stretch releasing double-sided adhesive strip 1410, and each may comprise a non-adhesive pull tab 1412.

A stretch releasing double-sided adhesive strip 1410 may be similar to the stretch releasing double-sided adhesive tape 1120 described above, such that the stretch releasing double-sided adhesive strip 1410 may be removed from an adherend by stretching the tape lengthwise in a direction approximately parallel to the adherend. For example, by pulling on the non-adhesive pull tab 1412, the stretch releasing double-sided adhesive strip 1410 may be cleanly removed from the housing 104, which may release the battery module 120. A new battery module 120 may then be adhered to the housing 104. Examples of a stretch releasing double-sided adhesive strip 1410 are Tesa 70425 from Biersdorf AG and VHB 5906 from Minnesota Mining and Manufacturing Company. Stretch releasing double-sided adhesive strips 1410 may be advantageous because of its vertical tension strength.

As is shown in the top view of FIG. 14B, after a battery module 120 is adhered to a housing 104 with one or more stretch releasing double-sided adhesive strips 1410, each respective non-adhesive pull tab 1412 of a stretch releasing double-sided adhesive strip 1410 is exposed and may be pulled to break the bond of the stretch releasing double-sided adhesive strip 1410 to one of the housing 104 and the battery module 120.

Battery Connector Retention

Figure 15:
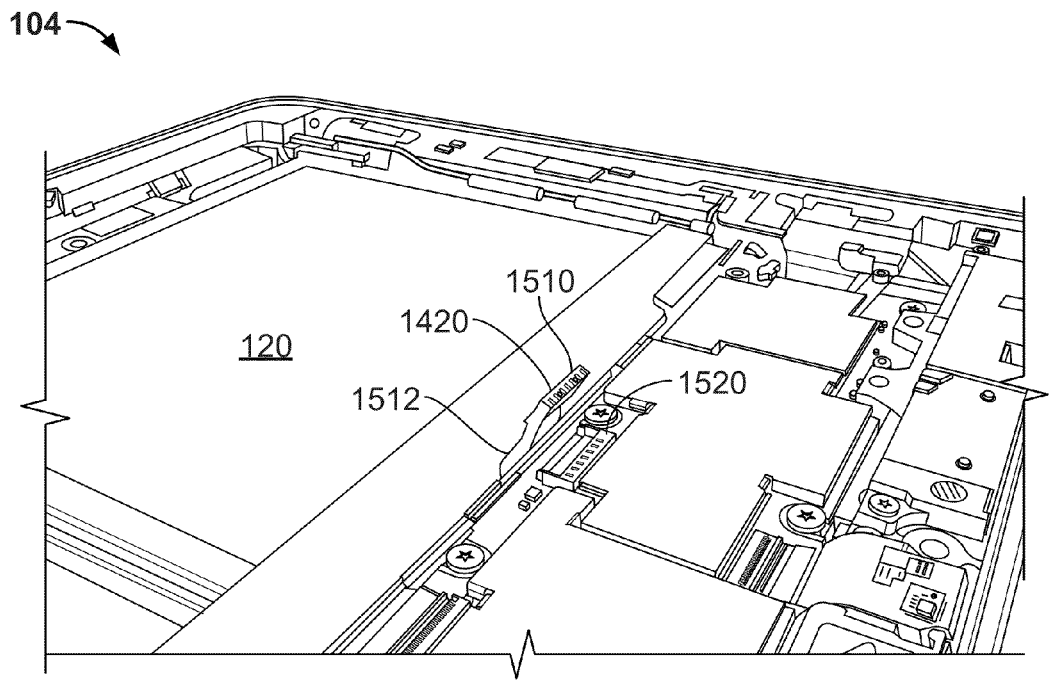
FIG. 15 illustrates a perspective view of a housing in accordance with various embodiments of the present invention.

FIG. 15 illustrates a perspective view of components contained in the housing 104 in accordance with various embodiments of the present invention. A battery module 120 may electrically couple to a component of a housing 104 via a battery connector 1420. A battery connector 1420 may be electrically coupled to the battery module 120 via a battery PCB 1430. A battery connector 1420 may have a plug 1510 that plugs into a socket 1520 of a component of a housing 104. The battery connector 1420 can be held in place with a battery connector retainer 130, such as a compliant stretch releasing single-sided adhesive tape, that conforms to the surfaces, grooves, and crevices of the battery connector 1420 and surrounding components of the housing 104. Accordingly, a battery connector retainer 130, such as a stretch releasing single-sided adhesive tape, blankets the battery connector 1420 and surrounding components by touching the exposed surfaces beneath the battery connector retainer 130, which may effectively pull a plug 1510 down into a socket 1520, removing the need for gluing a plug 1510 into a socket 1520. Furthermore, the battery connector retainer 130, such as a stretch releasing single-sided adhesive tape, may easily be removed by pulling a non-adhesive pull tab 1912 in a bonding plane direction. The bonding strength and removability of the battery connector retainer 130 is advantageous over Katpon tape, which does not have an adequate retention force, and over hot melt glue and caulking, which do not have an ease of releasing from a battery connector 1420.

As is illustrated in FIG. 15, a battery module 120 may comprise a battery connector 1420 attached to the battery module 120. The battery connector 1420 may comprise at least one wire 1512 attached to the battery module 120, and a plug 1510 attached to the at least one wire 1512. The plug 1510 may be plugged into a socket 1520 of a component of a mobile computing device 100. FIG. 15 illustrates a plug 1510 that is unplugged from a socket 1520.

Figure 16:
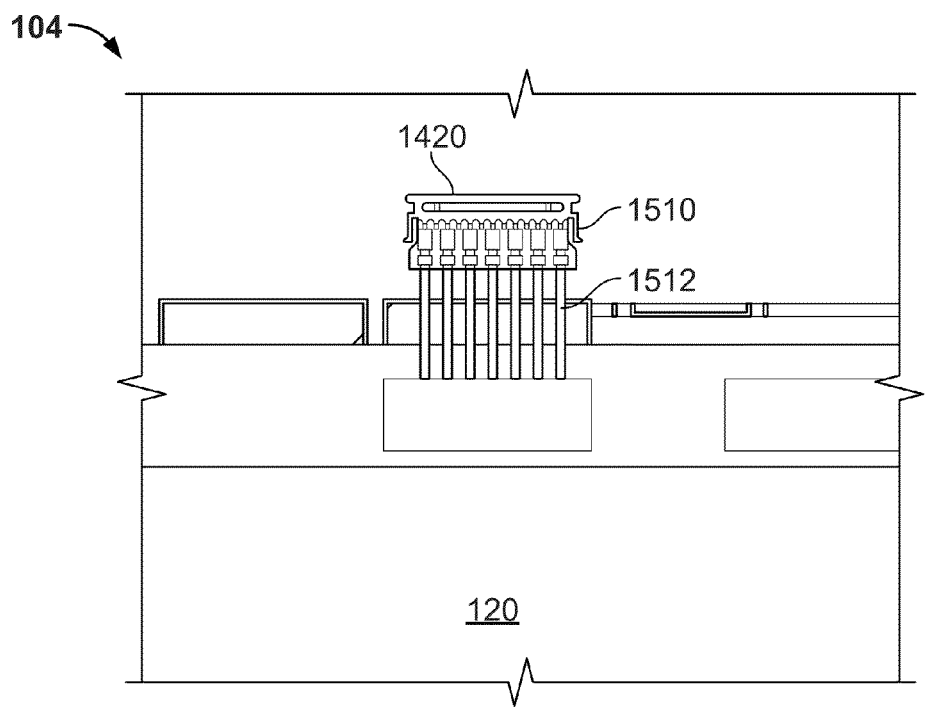
FIG. 16 illustrates a top view of a housing in accordance with various embodiments of the present invention.

FIG. 16 illustrates a top view of a housing 104 in accordance with various embodiments of the present invention. As is illustrated in FIG. 16, a battery connector 1420 may comprise seven wires 1512 attached to the battery module 120 and the plug 1510. In an alternative embodiment, the wires 1512 may reside in a cable, such as a flexible flat cable.

Figure 17:
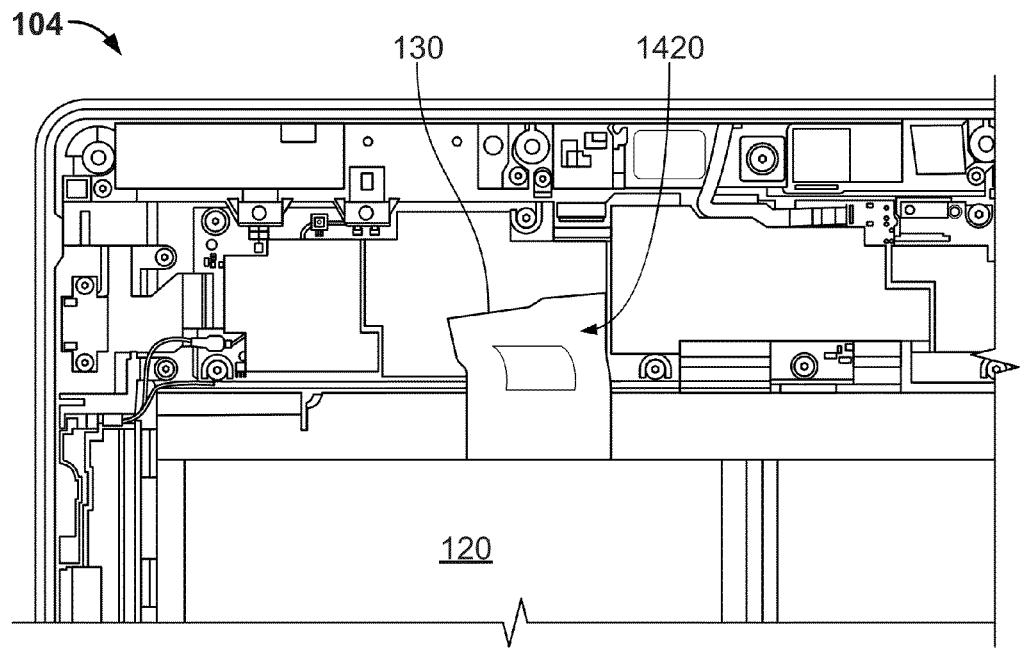
FIG. 17 illustrates a top view of a housing in accordance with various embodiments of the present invention.

FIG. 17 illustrates a top view of a housing 104 in accordance with various embodiments of the present invention. As is illustrated in FIG. 17, a battery connector retainer 130 may retain a battery connector 1420 of a battery module 120 into a respective socket 1520. As discussed further below, the battery connector retainer 130 may comprise a stretch releasing single-sided adhesive tape. Such a tape may comprise a backing and a single adhesive layer. The backing may comprise a film layer, such as a polyurethane film. An adhesive layer may comprise a pressure sensitive adhesive, such as synthetic rubber or acrylic. A stretch releasing single-sided adhesive tape may be removed from an adherend by stretching the tape lengthwise in a direction approximately parallel to the adherend. For example, by pulling on a non-adhesive pull tab, the tape may be cleanly removed.

A battery connector retainer 130, such as a compliant stretch releasing single-sided adhesive tape, may be adhered to a battery connector 1420 after it is plugged into a respective socket 1520. The battery connector retainer 130, such as a compliant stretch releasing single-sided adhesive tape, may also be adhered to surfaces surrounding the respective socket 1520, such as a battery module 120, a printed circuit board, and a shield can. The battery connector retainer 130 may conform to uneven and irregular surfaces and crevices, such as peaks and valleys of components, thus increasing the retaining strength of the battery connector retainer 130 to the battery connector 1420.

Figure 18:
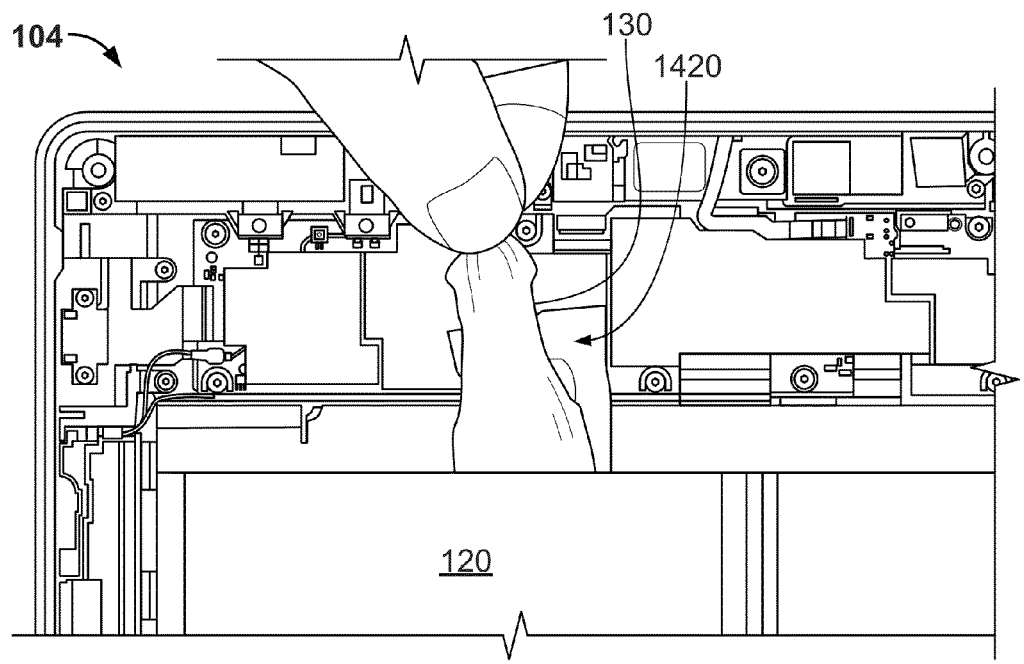
FIG. 18 illustrates a top view of a housing in accordance with various embodiments of the present invention.

FIG. 18 illustrates a top view of a housing 104 in accordance with various embodiments of the present invention. As is illustrated in FIG. 18, a battery connector retainer 130 may be pulled to release the battery connector retainer 130 from the battery connector 1420 connected to the battery module 120. Accordingly, a battery connector retainer 130 that is pliable and conformable to the battery connector 1420 and surrounding surfaces may be easily removable as well.

Figure 19A:
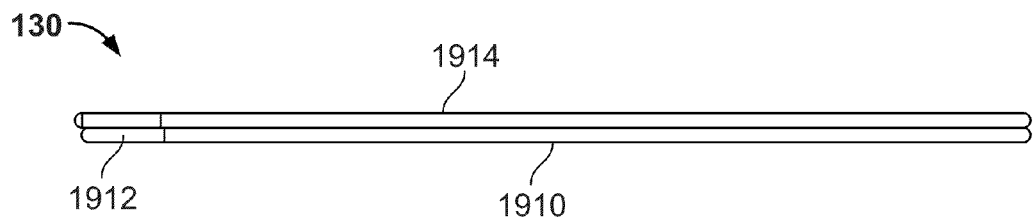
FIGS. 19A-19B illustrate a battery connector retainer in accordance with various embodiments of the present invention.
Figure 19B:
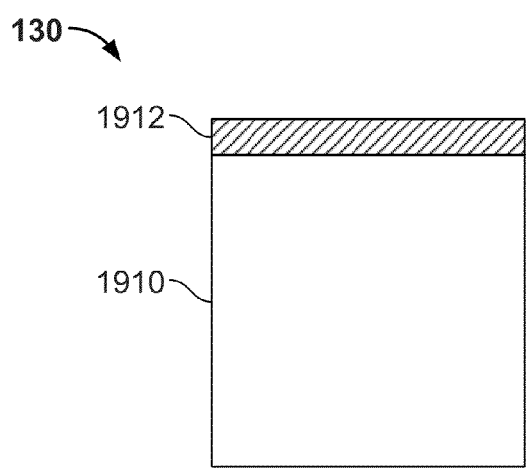

FIGS. 19A-19B illustrate a battery connector retainer 130 in accordance with various embodiments of the present invention. A battery connector retainer 130 is shown in FIG. 19A as a cross-sectional view, and in FIG. 19B as a bottom view. A battery connector retainer 130 may comprise a stretch releasing double-sided adhesive tape 1910 with a non-adhesive pull tab 1912 and with a film layer 1914 on one adhesive side, which transforms the double-sided tape into a single sided tape. The film layer 1914 may comprise a flexible polyurethane film. The film layer 1914 may be flexible and thin such that the double-sided adhesive tape 1910 maintains its compliant properties as well as its adhesive strength to the battery connector 1420. Examples of stretch releasing double-sided adhesive tape 1910 are Tesa 70425 from Biersdorf AG and VHB 5906 from Minnesota Mining and Manufacturing Company. In some embodiments, a film layer 1914 may be 1 mil thick. Examples of a film layer 1914 are Polymer Science, Inc.'s part description PS-0249. The film layer 1914 may also prevent the battery connector retainer 130 from inadvertently adhering to a display module 102. The film layer 1914 may be one millimeter in thickness and may be applied to one side of the stretch releasing double-sided adhesive tape 1910 through dye cutting. Accordingly, the side opposite the film layer 1914 may be adhered to the battery connector 1420 and the surrounding components. In an alternative embodiment, a battery connector retainer 130 comprises a stretch releasing adhesive tape that is single-sided. In such an embodiment, a polyurethane film 1940 would be unnecessary because the stretch releasing adhesive tape would comprise a single adhesive layer.

Port Component Bias

FIG. 20 illustrates a perspective view of a portion of the housing 104 including a port component 140, in accordance with various embodiments of the present invention. Many mobile computing devices are provided with ports for receiving a plug for wired power delivery, data communication, or external peripherals, such as, for example, ports compliant with a USB standard. According to one embodiment of the invention, a socket portion 2010 of a port component 140 is positioned adjacent to a port opening 2012 of a housing 104. It is desirable for the socket portion 2010 to be precisely aligned with and contacting the port opening 2012, thus eliminating or reducing any visible gap between the socket portion 2010 and the housing 104. In typical manufacturing processes, gaps between components may be caused when multiple components, each with its own dimensional tolerances, are coupled in sequence with each other, resulting in a stacking up of the dimensional tolerances. When the final component (e.g., the socket portion 2010) in a series of coupled components is aligned with another portion of the device (e.g., the port opening 2012), the position of the final component may vary dramatically.

In accordance with embodiments of the present invention, a connector module 2110 provided with alignment features may be used to ensure precise alignment of a component contained in the housing 104 with an alignment target, such as a port opening 2012. The component (e.g., a port component 140) is coupled to the connector module 2110, and the connector module is coupled to the housing 104 or other component contained in the housing 104. For example, the connector module 2110 may be coupled to an interior portion of the base of the housing 104 and at least proximate to an interior portion of either the first or second side wall of the housing, such as the port opening 2012. As the connector module 2110 is placed into position in a first direction, for example, as the port component 140 abuts the port opening 2012 of the housing 104, the alignment features also drive the connector module 2110 in a second direction towards the alignment target. In some embodiments, the second direction may be at an acute angle or at a right angle to the first direction, or the second direction may be approximately perpendicular to the first direction. In some embodiments, after the connector module is placed into position within the housing 104, it may be fastened to the housing 104. For example, a connector module 2110 may couple to the housing 104 by passing a portion of a threaded screw (not shown) through the fastener opening 2118 of the connector module 2110 and engaging a threaded hole 2022 of the housing 104.

In the embodiment in FIGS. 20-22, a connector module 2110 supports the component (e.g., the USB port component 140). The alignment features of the connector module 2110 comprise two plastic alignment features 2116, such as protruding ribs, positioned on the opposite side of a connector module 2110 from a socket portion 2010 of the port component 140. The connector module 2110 may be placed into the housing 104, for example, by inserting the socket portion 2010 into the port opening 2012 and then exerting a force against the opposite side of the connector module 2110 from the socket portion 2010 of the port component 140. As the connector module 2110 is coaxed closer to the housing 104, the alignment feature 2116 may bias the socket portion 2010 in the direction of the alignment target (e.g., port opening 2012 of the housing 104). For example, the alignment feature 2116 may cause the socket portion 2010 to be pushed towards the port opening 2012, until the socket portion 2010 reaches a hard stop against the housing 104, after which the alignment feature 2116 may be crushed or deformed as the force continues to coax the connector module 2110 to the housing 104.

Figure 20A:
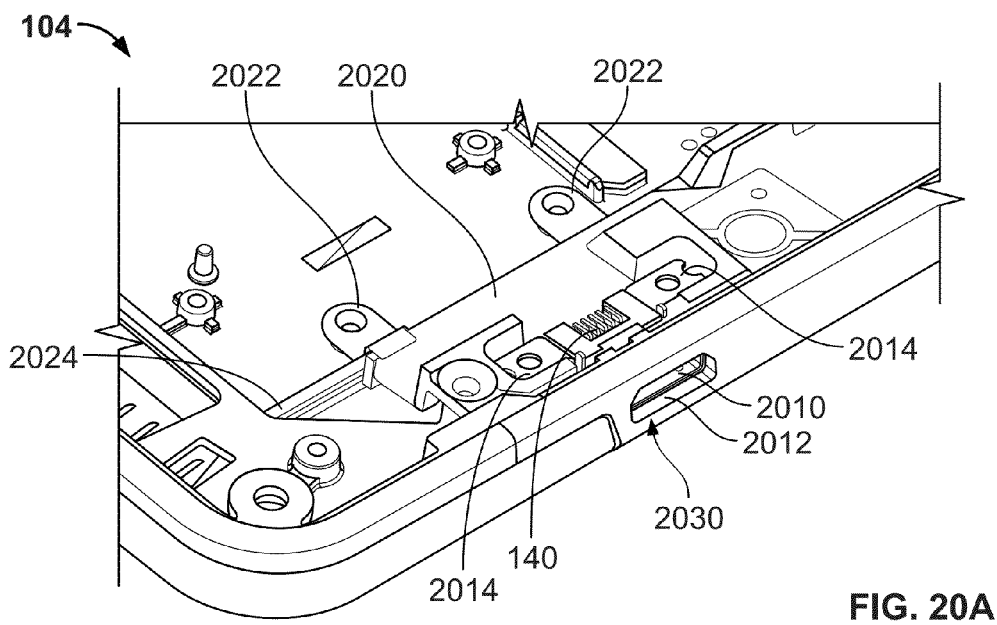
FIGS. 20A-20B illustrate perspective views of a port component and a connector module in a housing in accordance with various embodiments of the present invention.

As shown in FIG. 20A, a housing 104 may contain a port component 140, such as a Universal Serial Bus port. A port component 140 may comprise a socket portion 2010 and at least one unthreaded hole 2014. A socket portion 2010 may reside in a port opening 2012 of a housing 104. Accordingly, a port adapter (not shown) may be plugged into the socket portion 2010 through the port opening 2012. The housing 104 may comprise a port opening 2012, a connector module recess 2020, at least one threaded hole 2022, and a ridge 2024.

Figure 20B:
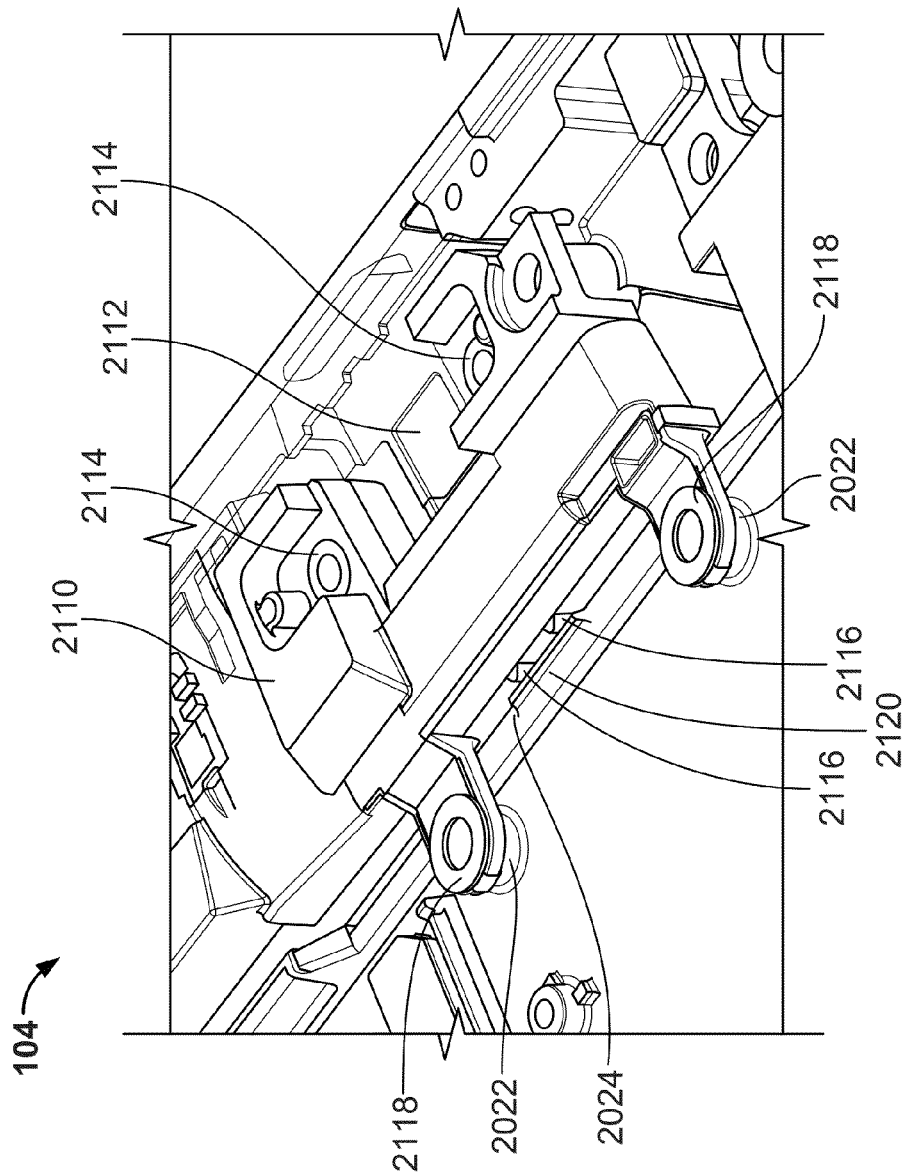

FIG. 20B illustrates a perspective view of a connector module 2110 in the housing 104 in accordance with various embodiments of the present invention. As shown in FIG. 20B, a housing 104 may include a connector module 2110 that resides in a connector module recess 2020. The connector module 2110 may comprise a port component recess 2112, in which a port component 140 may reside. A port component 140 may couple to the connector module 2110 by passing a portion of a threaded screw (not shown) through an unthreaded hole 2014 of the port component 140 and engaging a threaded hole 2114 of the connector module 2110.

A connector module 2110 may reside in a connector module recess 2020, which may be in between a ridge 2024 and a port opening 2012. A connector module 2110 may comprise at least one alignment feature 2116, such as a protruding body or a protruding rib, that may rest against the ridge 2024 of the housing 104. In some embodiments, as shown in FIG. 21, a portion of the ridge 2024 may comprise a crowned portion 2120 to provide additional contact with at least one alignment feature 2116.

The at least one alignment feature 2116 may depress against the crowned portion 2120 of the ridge 2024 and bias the connector module in a direction towards the port opening 2012 of the housing 104. The at least one alignment feature 2116 may comprise a protruding body comprising a material that is deformable and that is softer than the harder material of the ridge 2024. For example, a ridge 2024 and its crowned portion 2120 may comprise a metal alloy material, and the at least one alignment feature 2116 may comprise a plastic material. Accordingly, the at least one alignment feature 2116 may crush against the crowned portion 2120 of the ridge 2024 when the connector module 2110 is coupled to the housing 104, as discussed further below. In some embodiments, a distal end of the protruding body may be narrower than a proximate end, to enhance the deformability of the protruding body.

FIG. 21 illustrates a cross-sectional view of a connector module 2110 in the housing 104 in accordance with various embodiments of the present invention. As shown in FIG. 21, a crowned portion 2120 of a ridge 2024 may have a chamfer 2210, and an alignment feature 2116 of a connector module 2110 may also have a chamfer 2220 that corresponds to the chamfer 2210. Although there may be interference 2230 between a portion of the alignment feature 2116 and a portion of the ridge 2024, the chamfer 2220 and the chamfer 2210 may facilitate the initiation of the contact of the alignment feature 2116 with a portion of the ridge 2024 with interference or collision, as shown in FIG. 21. In some embodiments, either or both of a chamfer 2210 and a chamfer 2220 may be excluded. As a force is applied to the connector module 2110, for example in a downward direction, the at least one alignment feature 2116 may push against the crowned portion 2120 of the ridge 2024, causing the connector module 2110 to bias in the direction of the port opening 2012 of the housing 104. Accordingly, if the port component 104 is coupled to the connector module 2110, then any gap 2030 between the socket portion 2010 of the port component 104 and the port opening 2012 portion of the housing 104 may be eliminated, minimized or reduced as the force is applied to the connector module 2110. In some embodiments, the gap 2030 to be eliminated, minimized or reduced may be between 0.3 to 0.5 millimeters.

In some embodiments, when the gap 2030 is eliminated, minimized or reduced, if a force is continued to be applied to the connector module 2110, for example in a downward direction, because there is a hard stop bias of the connector module 2110 and the port module 104 at the port opening 2012 portion of the housing 104, the at least one alignment feature 2116 may start to deform, as shown by the interference 2230 of FIG. 21. In some embodiments, as a force is applied to the connector module 2110, the at least one alignment feature 2116 may cause a corresponding force to move the connector module 2110 in the direction of the port opening 2012 of the housing 104 at an acute angle, until the socket portion 2010 of the port component 140 is seated against the port opening 2012 of the housing 104, after which the at least one alignment feature 2116 may become deformed or crushed as a continued force is applied. Accordingly, in part because of at least one alignment feature 2116, a socket portion 2010 can be biased against a port opening 2012 simply by coupling a connector module 2110 to a housing 104.

FIGS. 22A and 22B illustrate cross-sectional views of a connector module in a housing 104 in accordance with various embodiments of the present invention. FIG. 22A illustrates an alignment feature 2116 before interference with a ridge 2024. FIG. 22B illustrates an alignment feature 2116 after interference 2230 with a ridge 2024. It is to be understood that the size and the amount of interference is dependent upon a corresponding gap 2030 described above.

Antenna Grounding Clip

Figure 23:
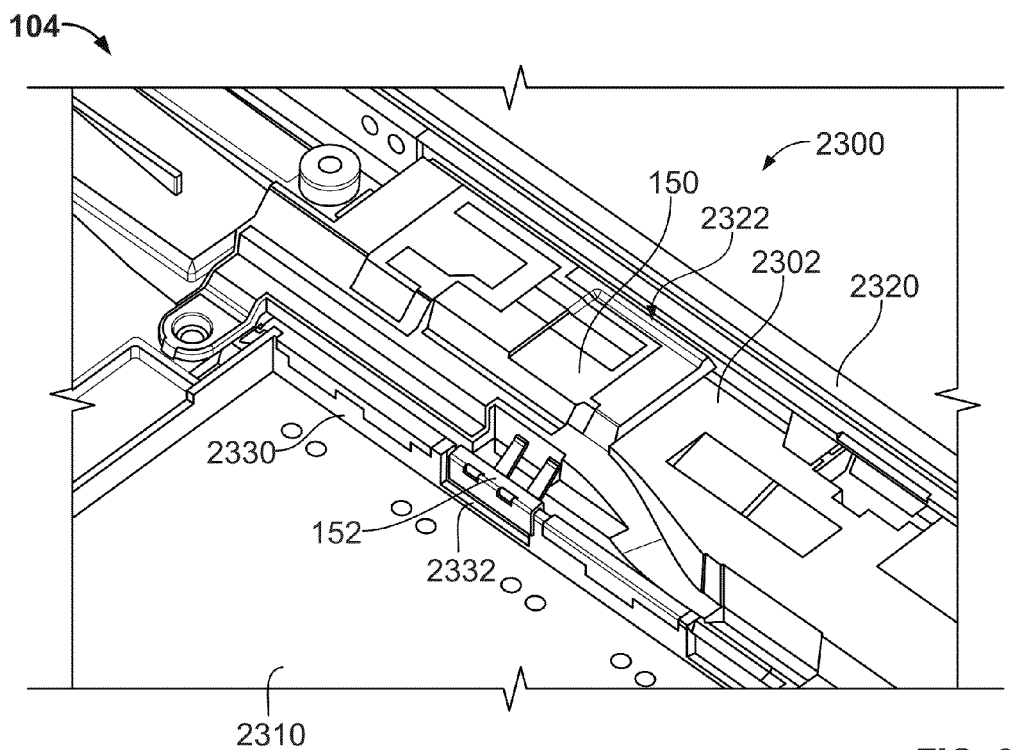
FIG. 23 illustrates a perspective view of a grounding clip in a housing in accordance with various embodiments of the present invention.

FIG. 23 illustrates a perspective view of a grounding clip 152 in the housing 104 in accordance with various embodiments of the present invention. An antenna portion 2300 of the housing may comprise a conductive antenna module 150 and an electrically insulative substrate 2302 on which the antenna module 150 is formed. The antenna module may, for example, be coupled to an interior portion of the base of the housing, such as the antenna module recess 2322, and at least proximate an interior portion of either the first or second side wall of the housing. The electrically insulative substrate 2302 may be comprised of plastic and may be generally unsuitable for providing an electrical grounding path in the absence of metallic or other conductive materials. Accordingly, a conductive grounding clip 152 may clip to a metallic alloy surface of a housing 104. The grounding clip 152 may have two prongs 2420 that are positioned toward the antenna module 150 and, with a spring force of the prongs 2420, press against the antenna module 150. Accordingly, a ground path may be established between the antenna module 150 and the housing 104 via the grounding clip 152.

As shown in FIG. 23, a housing 104 may contain an antenna module 150. The antenna module 150 may be a laser direct structuring (LDS) antenna that optimizes the utilization of available space within a mobile computing device 100. LDS may comprise a process that uses a laser to transfer a pattern directly onto a three-dimensional object. For example, the object may be an injection molded component of an antenna module, comprising a laser activatable thermoplastic. A laser beam may scribe an antenna radiator pattern directly onto the injection molded component. The activated surface from the scribed pattern may then be plated, such as with copper, nickel, and gold, among other plating materials. The plated pattern forms a radiator of an antenna module. Such an antenna module may be reduced in parts, weight, size, assembly time, and cost.

A housing 104 may be comprised substantially of metal alloy, such as magnesium alloy and aluminum alloy, which may provide electrical grounding for the antenna module 150. However, in order to improve reception and transmission by the antenna module 150, a portion of the housing 104 may be comprised of a radio transparent material, such as plastic, glass, ceramic, as well as other similar materials. Such materials may, for example, avoid signal attenuation. As shown in FIG. 23, a portion of the housing 104 may comprise metal alloy 2310 and another portion of the housing 104 may comprise plastic 2320. An antenna module recess 2322 may be adjacent the portion of the housing comprising plastic 2320, which may increase radio transparency for the antenna module 150. However, as shown in FIG. 23, the antenna module 150 is not adjacent the portion of the housing comprising metal alloy 2310, which may provide a ground. Accordingly, it may be advantageous to ground the antenna module 150, and, as described further below, a housing 104 may comprise a ridge 2330, which may comprise a grounding clip recess 2332 in which a grounding clip 152 may be located to ground the antenna module 150. As shown in FIG. 23, even when the ridge partially comprises plastic material, the grounding clip recess 2332 exposes a metallic portion of the ridge 2330.

Figure 24:
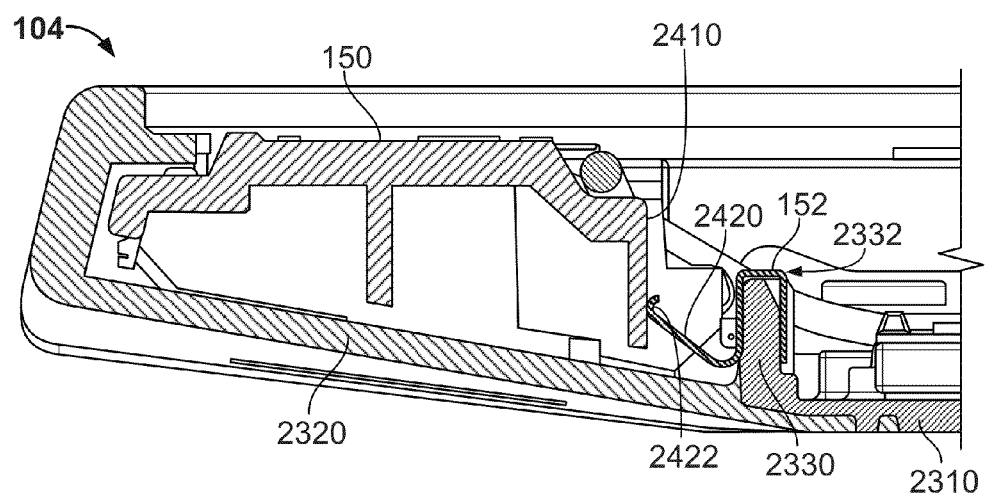
FIG. 24 illustrates a cross-sectional view of a housing in accordance with various embodiments of the present invention.

FIG. 24 illustrates a cross-sectional view of a housing 104 in accordance with various embodiments of the present invention. As shown in FIG. 24, a housing 104 may comprise a plastic portion 2320, which may provide radio transparent properties, and a metallic portion 2310, which may provide grounding properties. A ridge 2330 may electrically couple with the metal alloy portion 2310 of the housing 104, and a grounding clip 152 may electrically couple with the grounding clip recess 2332 of the ridge 2330. For example, the body 2510 of the grounding clip 152 may couple to an interior portion of the base of the housing 104, such as a ridge 2330, which is proximate another interior portion of the base of the housing 104, such as the antenna module recess 2322. As further discussed below, a grounding clip 152 may comprise at least one prong 2420. A portion of a prong 2420 may rest with a spring force against a portion of the antenna module 150, for example, a tip 2422 of the prong 2420 may electrically couple with a conductive antenna portion 2410, such as an LDS pattern, located on the antenna module 150. Accordingly, a grounding clip 152 may be an electrical conduit from the antenna module 150 to the metallic portion 2310 of the housing 104.

Figure 25:
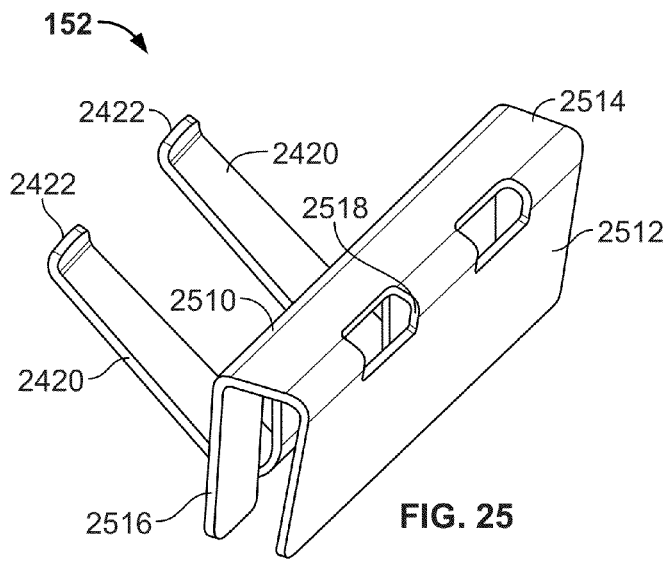
FIG. 25 illustrates a perspective view of a grounding clip in accordance with various embodiments of the present invention.

FIG. 25 illustrates a perspective view of a grounding clip 152 in accordance with various embodiments of the present invention. As shown in FIG. 25, a grounding clip 152 may comprise a body 2510. The body may comprise a back leg 2512, a spine 2514 coupled to the back leg 2512, and a front leg 2516 coupled to the spine 2514. The grounding clip 152 may comprise at least one hole 2518 between the back leg 2512 and the spine 2514. As shown in FIG. 25, the grounding clip 152 may comprise two holes 2518. The grounding clip 152 may comprise at least one prong 2420 coupled to the front leg 2516, and a distal end of a prong 2420 may comprise a tip 2422. As shown in FIG. 25, a grounding clip may comprise two prongs 2420. The grounding clip 152 may comprise an electrically conductive material, such as a metal alloy.

Figure 26:
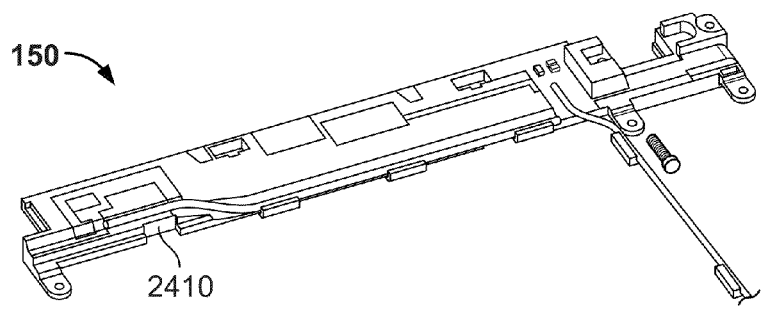
FIG. 26 illustrates a perspective view of an antenna module in accordance with various embodiments of the present invention.

FIG. 26 illustrates a perspective view of an antenna module 150 in accordance with various embodiments of the present invention. As shown in FIG. 26, a conductive antenna portion, such as an LDS pattern, is exposed on a portion of the surface of the antenna module 150.

Figure 27:
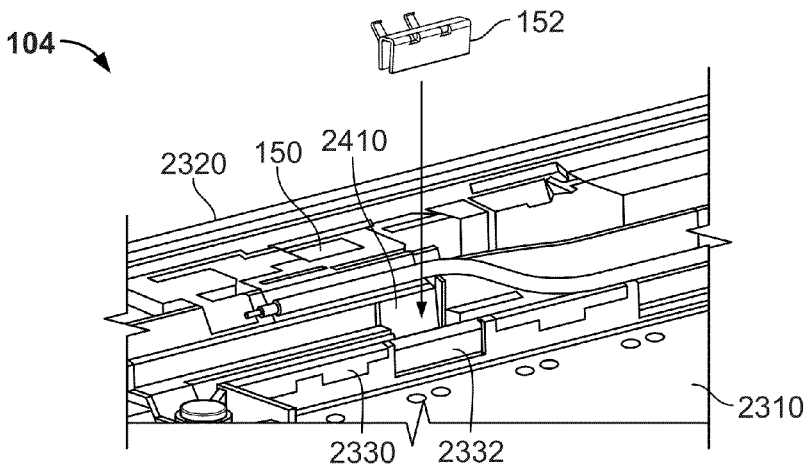
FIG. 27 illustrates an exploded, cross-sectional view of a housing in accordance with various embodiments of the present invention.

FIG. 27 illustrates an exploded, cross-sectional view of a housing 104 in accordance with various embodiments of the present invention. As is shown in FIG. 27, a housing 104 comprises a metallic portion 2310 and a plastic portion 2320, and an antenna module 150 is proximate the plastic portion 2320. A ridge 2330 is adjacent the antenna module 150, and the ridge 2330 comprises a grounding clip recess 2332, to which a grounding clip 152 may couple.

Under an embodiment, the body 2510 of the grounding clip may couple to the grounding clip recess 2332. Accordingly, the width of the spine 2514 would be a comparable size to the thickness of the grounding clip recess 2332, and the lengths of the back leg 2512 and the front leg 2516 would be a comparable size to the height of the grounding clip recess 2332. The body 2510 may form a spring such that the back leg 2512 and the front leg 2516 resiliently grip the grounding clip recess 2332. Under one embodiment, the at least one prong 2420 may form a spring such that the tip 2422 of the at least one prong 2420 presses against the conductive antenna portion 2410 of the antenna module 150. The conductive antenna portion 2410 may, for example, comprise an LDS pattern.

Mechanical Interlock

In accordance with embodiments of the present invention, the housing or other component of an electronic device may comprise multiple materials. In some cases, one of the materials may comprise metal or metal alloy, and another one of those materials may comprise a different material, such as, e.g., a polymer, glass, ceramic, or other type of metal or metal alloy. The coupling of these different materials into a single structural component may pose various challenges. In accordance with embodiments of the present invention, it may be desirable to form high strength bonds between two dissimilar materials for use in, for example, the housing of electronic devices.

Figure 28:
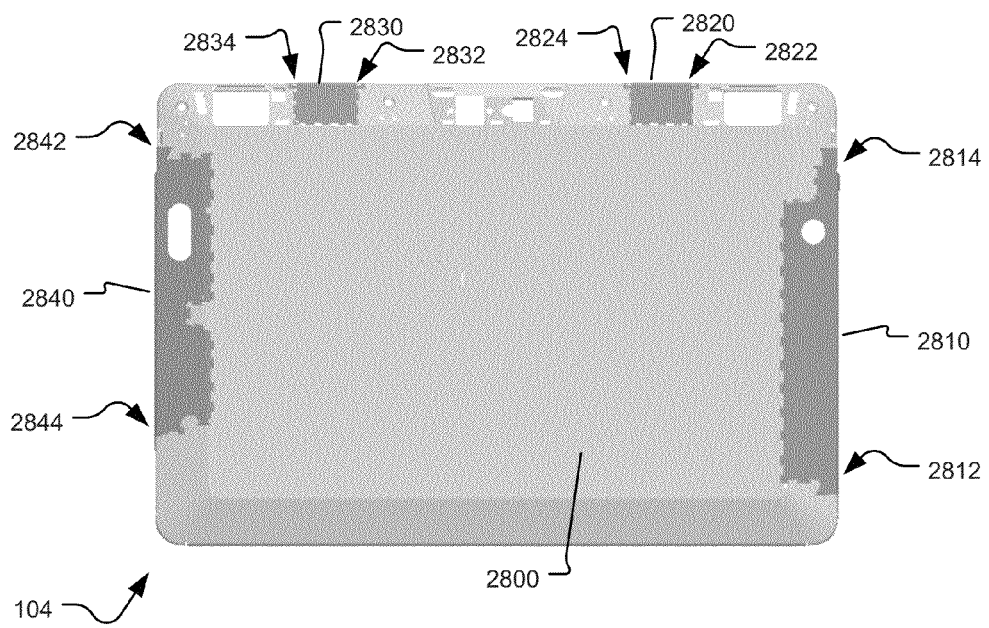
FIG. 28 illustrates an exterior view of a housing in accordance with various embodiments of the present invention.

FIG. 28 illustrates an exterior view of a housing 104 in accordance with various embodiments of the present invention. A housing 104 may be comprised of a metal alloy material portion 2800 and one or more plastic material portions that are overmolded to the metal alloy portion. For example, FIG. 28 illustrates a first side molding 2810, a first top molding 2820, a second top molding 2830, and a second side molding 2840. Because the materials of the housing 104 are dissimilar, an embodiment of the invention includes connecting mold retention holes, such as through-holes, to form an interlock mold in the metal alloy portion through which the plastic of the moldings 2810, 2820, 2830, 2840 are overmolded or injected, for example, to create a bond that improves the bonding of the moldings 2810, 2820, 2830, 2840 with the alloy portion 2800 and the overall rigidity of the housing 104. Because each area of an interlock may have different geometries, the geometries of the interlocks also may have different geometries of through-holes that are vertically oriented and horizontally oriented. In some embodiments, through-holes may be not parallel. In some embodiments, through-holes may be orthogonal. In some embodiments, through-holes may be orthogonal and intersecting. In some embodiments, through-holes may form at least one cross-shaped interlock mold.

The metallic alloy portion 2800 of the housing 104 may be formed into an appropriate shape, such as by machining, forging, molding, and other forming processes. The housing may have recesses in which molten material may be injected. Such material may be, for example, polymers, such as thermoplastics, thermostats, and elastomers, as well as metals and glasses. The metallic alloy portion 2800 may be placed in a suitably countered mold, and the molten material, such as a polymer, may be overmolded into respective recesses of the metallic alloy portion 2800, and bonded to the metallic alloy portion via mechanical interlocks, such as through-holes. After the molten material solidifies, the solidified material and the metallic alloy portion 2800 form a single assembly of a housing 104, as shown in FIG. 28.

According to an embodiment of the invention, the strength of the bond between two dissimilar materials, such as a polymer and a metal alloy, may be strengthened with overmolding of a cross-shaped interlock mold, as further described below. Such strengthening may mitigate defects in the bond such as part-lines and cracks between a polymer and the metal alloy. A cross-shaped interlock mold may comprise a chamber within the metallic alloy portion 2800, formed by at least two through-holes substantially on the same plane and substantially perpendicular to each other, in which the through-holes cross each other forming a central cavity. Each through-hole may have generally a cylinder shape, and two through-holes made together form a concave twelve sided polygon or a concave dodecagon, which may generally be in the form of a cross.

In some embodiments, a single cross-shaped chamber may comprise one X-axis (for example, horizontal) through-hole and one Y-axis (for example, vertical) through-hole, forming one central cavity. In another embodiment, a double cross-shaped chamber may comprise two X-axis through-holes and one Y-axis through-hole, forming two central cavities. In such an embodiment, the two X-axis through-holes may be optionally substantially parallel to each other, and may be optionally substantially residing on the same plane. In another embodiment, a multi-cross-shaped chamber may comprise two X-axis through-holes and two Y-axis through-holes, forming collectively four central cavities. It is to be understood that a multi-cross-shaped chamber may comprise a plurality of X-axis through-holes and a plurality of Y-axis through-holes, in which the number of central cavities is equal to the number of Y-axis through-holes multiplied by the number of Y-axis through-holes. It is also to be understood that, while an X-axis may be considered horizontal and a Y-axis may be considered vertical, such description is not limiting the position of an interlock in relation to a housing, but rather indicates the relative perpendicular positioning of through-holes with each other.

As shown in FIG. 28, the housing 104 may be configured with non-conductive molding portions to improve wireless radiofrequency (RF) communication transmissions for the mobile computing device 100. A housing 104 may comprise a first side molding 2810 having an interlock 2812 and an interlock 2814, a first top molding 2820 having an interlock 2822 and an interlock 2824, a second top molding 2830 having an interlock 2832 and an interlock 2834, and a second side molding 2840 having an interlock 2842 and an interlock 2844. The first top molding 2820 may be positioned over a first RF antenna module used for a first communications interface, such as for wireless local area network communications (WLAN), e.g., a WiFi network, and the second top molding 2830 may be positioned over a second RF antenna module used for a second communications interface, such as for wide area network (WAN) cellular communications, e.g., Global System for Mobile Communications (GSM), code-division multiple access (CDMA), or Code-division multiple access (CDMA).

Figure 29:
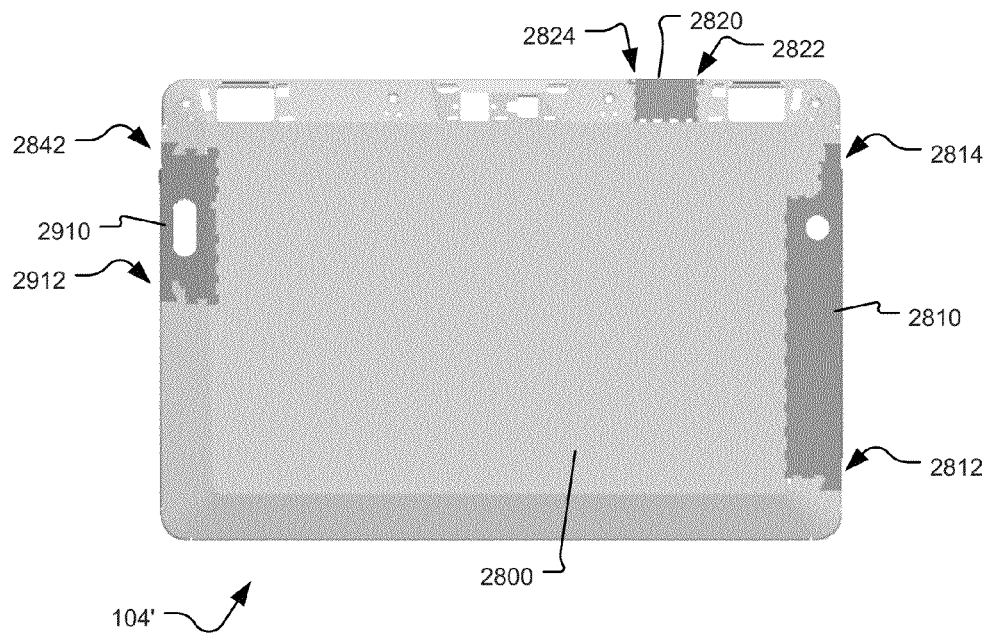
FIG. 29 illustrates an exterior view of a housing in accordance with various embodiments of the present invention.

FIG. 29 illustrates an exterior view of a housing 104' in accordance with various embodiments of the present invention. As depicted in FIG. 29, the housing 104' may be configured with moldings for a mobile computing device 100 enabled for a wireless local area network (WLAN), but not WAN communications. The housing 104' may have a first side molding 2810 and a first top molding 2820 similar to the moldings illustrated in FIG. 28. The housing 104' may also comprise a third side molding having an interlock 2842 that is similar to the corresponding interlock in FIG. 28, and having an interlock 2912. It is to be appreciated that the placement of moldings may vary based on, for example, the existence and placement of wireless communication components of a mobile computing device. For example, the second top molding 2830 of FIG. 28 may be proximate a global positioning system (GPS) antenna, which may be a wireless communication component that is absent from a device that utilizes housing 104' of FIG. 29. For further example, the second side molding 2840 may be proximate a Long Term Evolution (LTE) antenna, resulting in the second side molding 2840 being larger than the second side molding 2910.

Figure 30A:
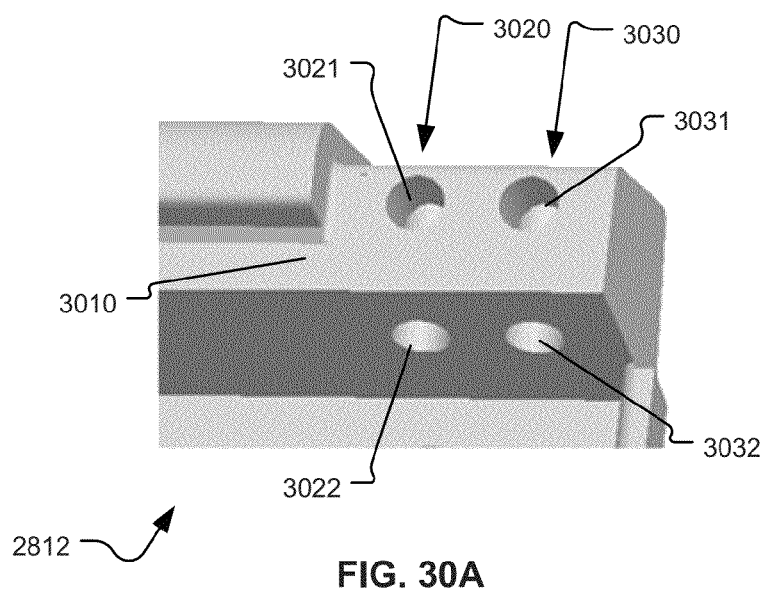
FIGS. 30A-30B illustrate perspective views of an interlock of a housing in accordance with various embodiments of the present invention.
Figure 30B:
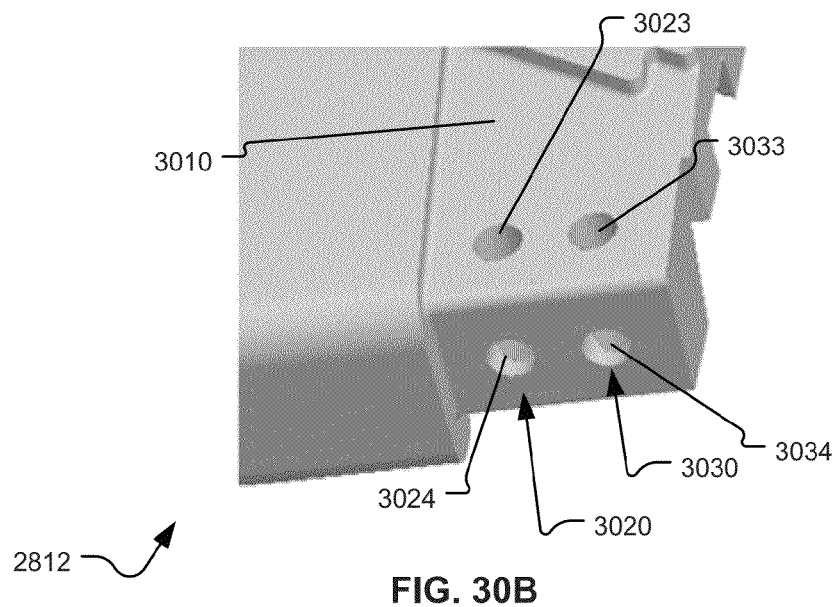

FIGS. 30A-30B illustrate perspective views of an interlock 2812 of a housing 104 in accordance with various embodiments of the present invention. FIG. 30A illustrates an injection mold core side, and FIG. 30B illustrates an injection mold cavity side. As shown in FIGS. 30A and 30B, a housing 104 may comprise an indentation 3010 which may be overmolded with injected polymer. As shown, the interlock 2812 comprises two single cross shaped chambers 3020, 3030. The first single cross shaped chamber 3020 comprises a Y-axis through-hole with opposing ends 3021 and 3023 and an X-axis through-hole with opposing ends 3022, 3024. The second single cross shaped chamber 3030 comprises a Y-axis through-hole with opposing ends 3031, 3033 and an X-axis through-hole with opposing ends 3032, 3034. When the indentation 3010 is overmolded with injected polymer, the injected polymer may fill the first single cross shaped chamber 3020 and the second single cross shaped chamber 3030.

Figure 31A:
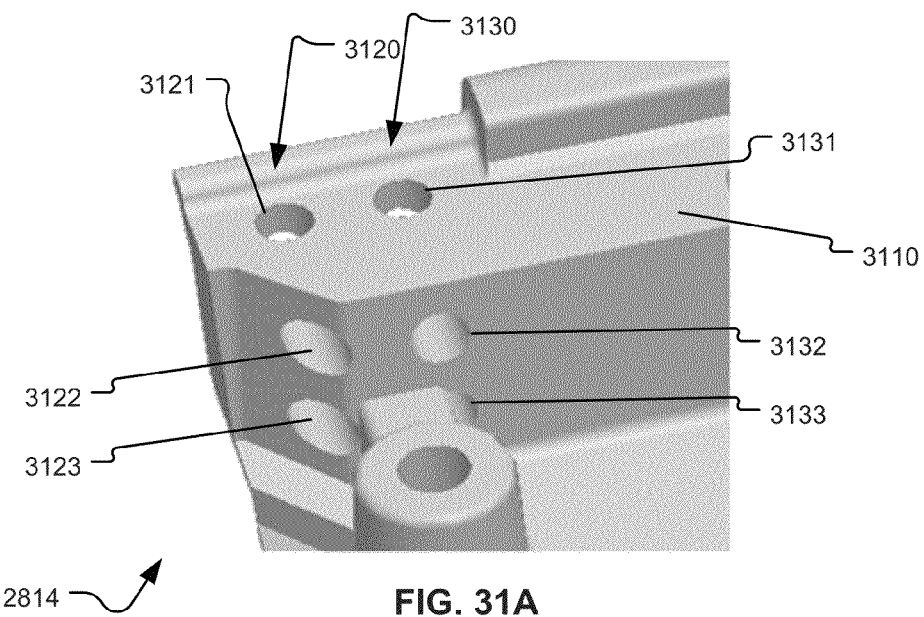
FIGS. 31A-31B illustrate perspective views of an interlock of a housing in accordance with various embodiments of the present invention.
Figure 31B:
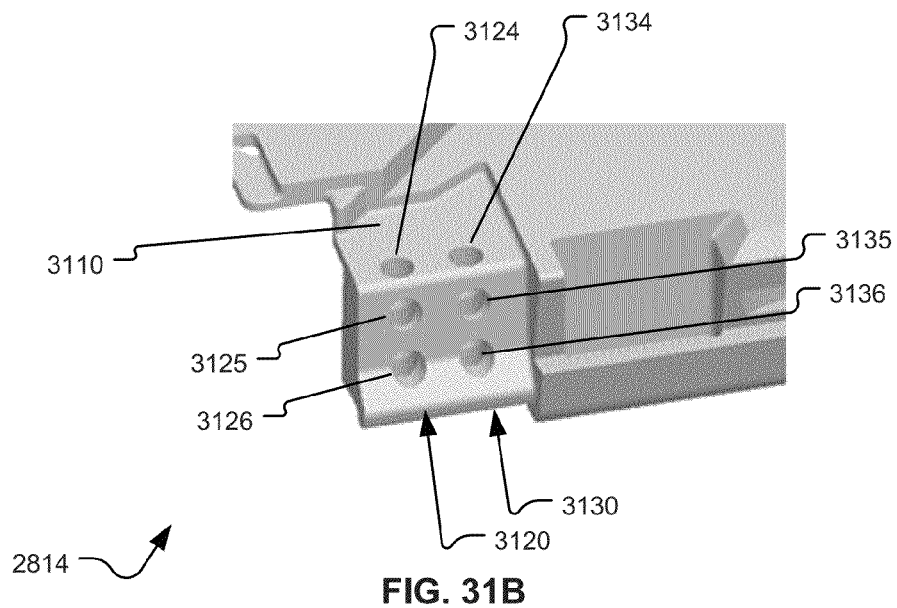

FIGS. 31A-31B illustrate perspective views of an interlock 2814 of the housing 104 in accordance with various embodiments the present invention. FIG. 31A illustrates a core side of an injection mold, and FIG. 30B illustrates an injection mold cavity side. As shown in FIGS. 31A and 31B, a housing 104 may comprise an indentation 3110 which may be overmolded with injected polymer. As shown, the interlock 2814 comprises two double cross shaped chambers 3120, 3130. The first double cross shaped chamber 3120 comprises a Y-axis through-hole with opposing ends 3121, 3124, a first X-axis through-hole with opposing ends 3122, 3125, and a second X-axis through-hole with opposing ends 3123, 3126. The second double cross shaped chamber 3130 comprises a Y-axis through-hole with opposing ends 3131, 3134, a first X-axis through-hole with opposing ends 3132, 3135, and a second X-axis through both opposing ends 3133, 3136. As is shown in FIG. 31A, the ends 3122, 3123 reside on a different plane than the ends 3132, 3133. When the indentation 3110 is overmolded with injected polymer, the injected polymer may fill the first double cross shaped chamber 3120 and the second double cross shaped chamber 3130.

Figure 32A:
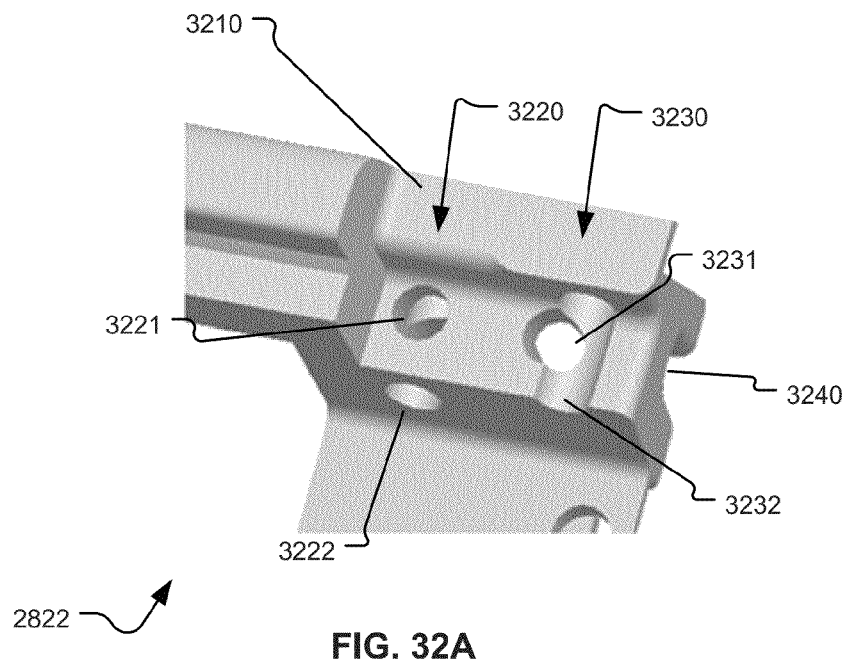
FIGS. 32A-32B illustrate perspective views of an interlock of a housing in accordance with various embodiments of the present invention.
Figure 32B:
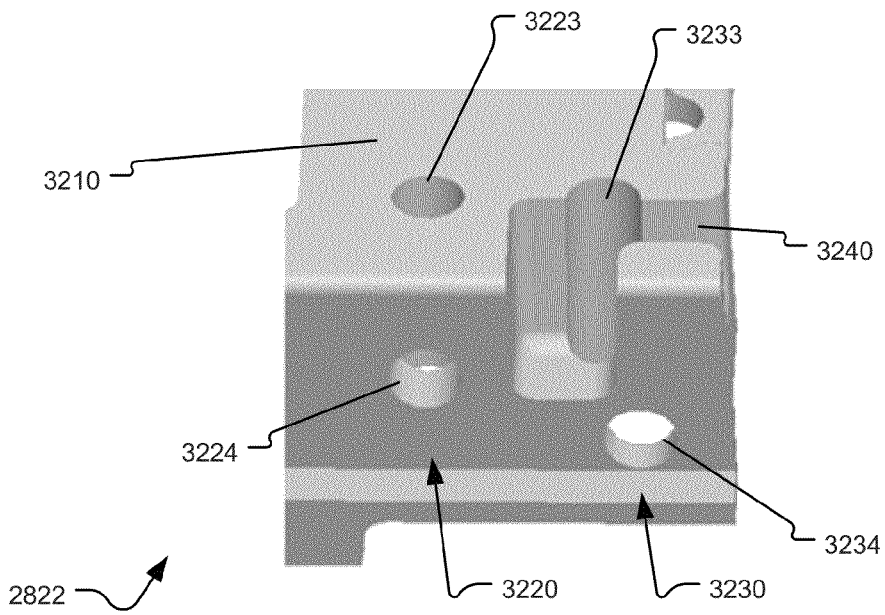

FIGS. 32A-32B illustrate perspective views of an interlock 2822 of a housing 104 in accordance with various embodiments of the present invention. FIG. 32A illustrates a core side of an injection mold, and FIG. 32B illustrates an injection mold cavity side. As shown in FIGS. 32A and 32B, a housing 104 may comprise an indentation 3210 which may be overmolded with injected polymer. As shown, the interlock 2822 comprises two single cross shaped chambers 3220, 3230. The first single cross shaped chamber 3220 comprises a Y-axis through-hole with opposing ends 3221 and 3223 and an X-axis through-hole with opposing ends 3222, 3224. The second single cross shaped chamber 3230 comprises a Y-axis through-hole with opposing ends 3231, 3233 and an X-axis through-hole with opposing ends 3232, 3234. As is shown in FIGS. 32A and 32B, the second single cross shaped chamber 3230 varies in that walls of through-holes are cut away and the center cavity is misaligned, with an extra chamber space 3240 passing through it. When the indentation 3210 is overmolded with injected polymer, the injected polymer may fill the first single cross shaped chamber 3220 and the second single cross shaped chamber 3230.

Figure 33A:
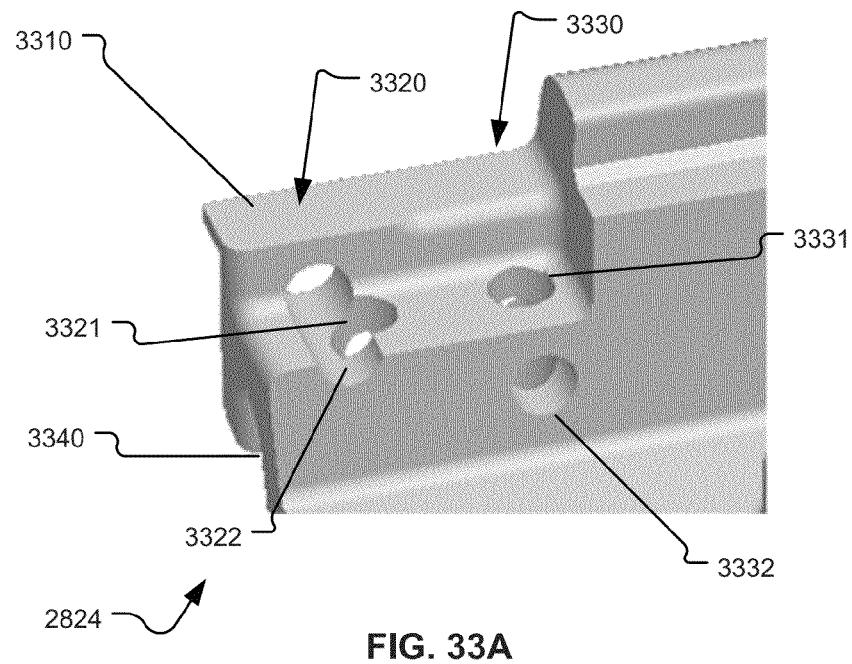
FIGS. 33A-33B illustrate perspective views of an interlock of a housing in accordance with various embodiments of the present invention.
Figure 33B:
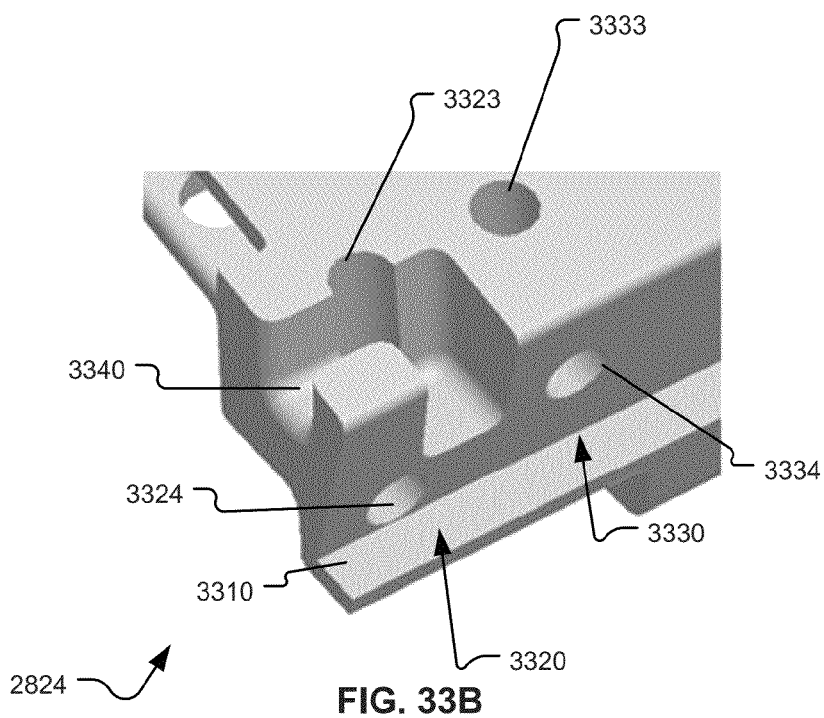

FIGS. 33A-33B illustrate perspective views of an interlock 2824 of a housing 104 in accordance with various embodiments of the present invention. FIG. 33A illustrates a core side of an injection mold, and FIG. 33B illustrates an injection mold cavity side. As shown in FIGS. 33A and 33B, a housing 104 may comprise an indentation 3310 which may be overmolded with injected polymer. As shown, the interlock 2824 comprises two single cross shaped chambers 3320, 3330. The first single cross shaped chamber 3320 comprises a Y-axis through-hole with opposing ends 3321 and 3323 and an X-axis through-hole with opposing ends 3322, 3324. The second single cross shaped chamber 3330 comprises a Y-axis through-hole with opposing ends 3331, 3333 and an X-axis through-hole with opposing ends 3332, 3334. As is shown in FIGS. 33A and 33B, the first single cross shaped chamber 3320 varies in that walls of through-holes are cut away and the center cavity is misaligned, with an extra chamber space 3340 passing through it. When the indentation 3310 is overmolded with injected polymer, the injected polymer may fill the first single cross shaped chamber 3320 and the second single cross shaped chamber 3330.

Figure 34A:
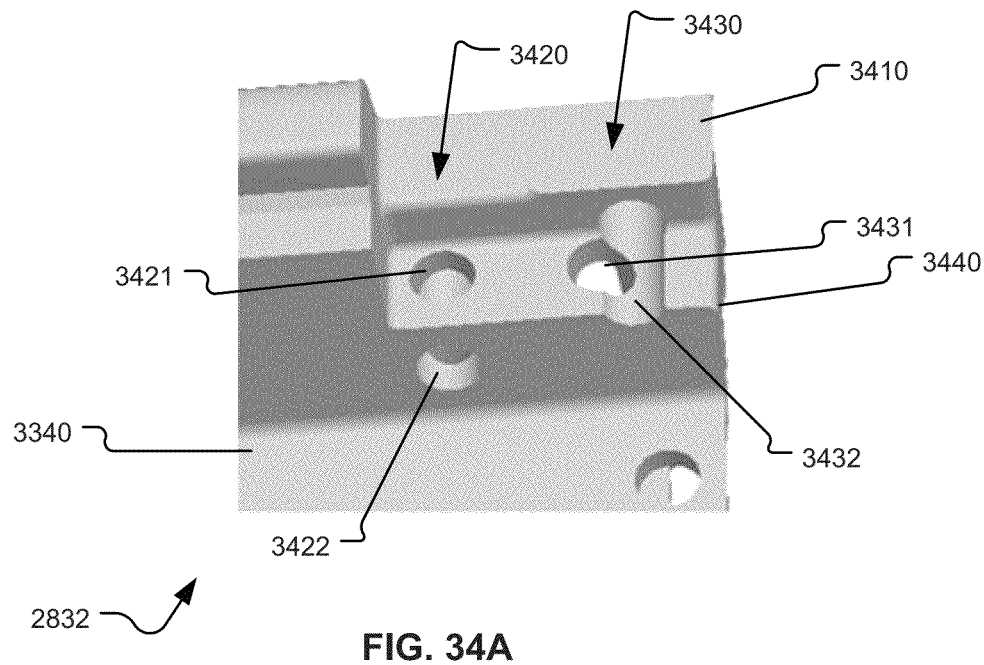
FIGS. 34A-34B illustrate perspective views of an interlock of a housing in accordance with various embodiments of the present invention.
Figure 34B:
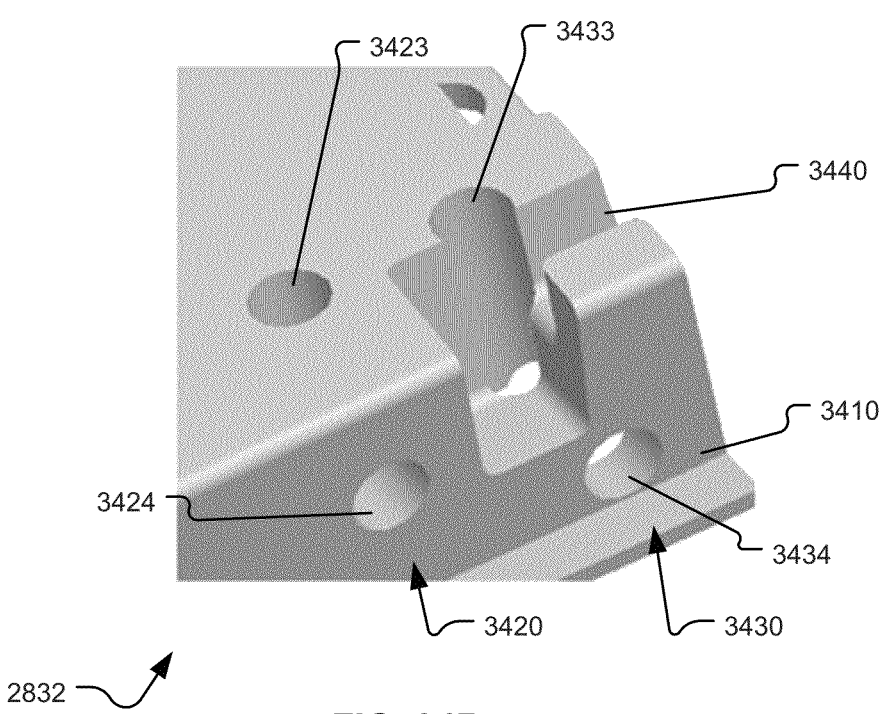

FIGS. 34A-34B illustrate perspective views of an interlock 2832 of a housing 104 in accordance with various embodiments of the present invention. FIG. 34A illustrates a core side of an injection mold, and FIG. 34B illustrates an injection mold cavity side. As shown in FIGS. 34A and 34B, a housing 104 may comprise an indentation 3410 which may be overmolded with injected polymer. As shown, the interlock 2832 comprises two single cross shaped chambers 3420, 3430. The first single cross shaped chamber 3420 comprises a Y-axis through-hole with opposing ends 3421 and 3423 and an X-axis through-hole with opposing ends 3422, 3424. The second single cross shaped chamber 3430 comprises a Y-axis through-hole with opposing ends 3431, 3433 and an X-axis through-hole with opposing ends 3432, 3434. As is shown in FIGS. 34A and 34B, the second single cross shaped chamber 3430 varies in that walls of through-holes are cut away and the center cavity is misaligned, with an extra chamber space 3440 passing through it. When the indentation 3410 is overmolded with injected polymer, the injected polymer may fill the first single cross shaped chamber 3420 and the second single cross shaped chamber 3430.

Figure 35A:
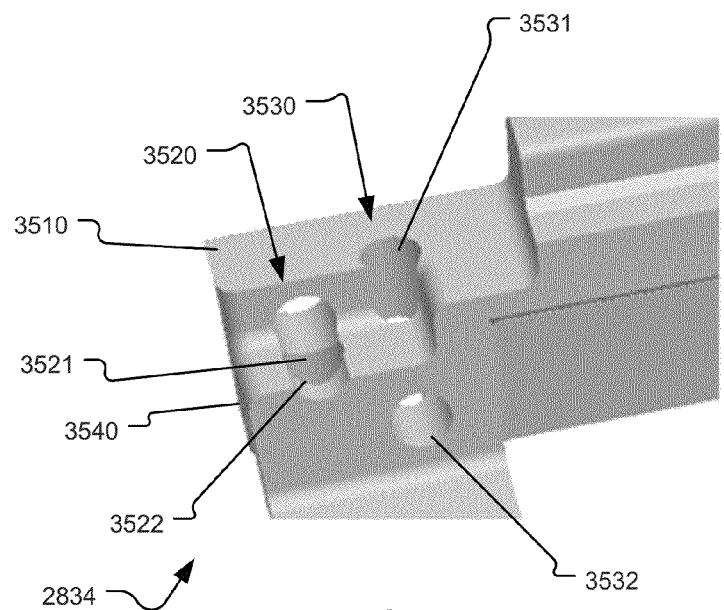
FIGS. 35A-35B illustrate perspective views of an interlock of a housing in accordance with various embodiments of the present invention.
Figure 35B:
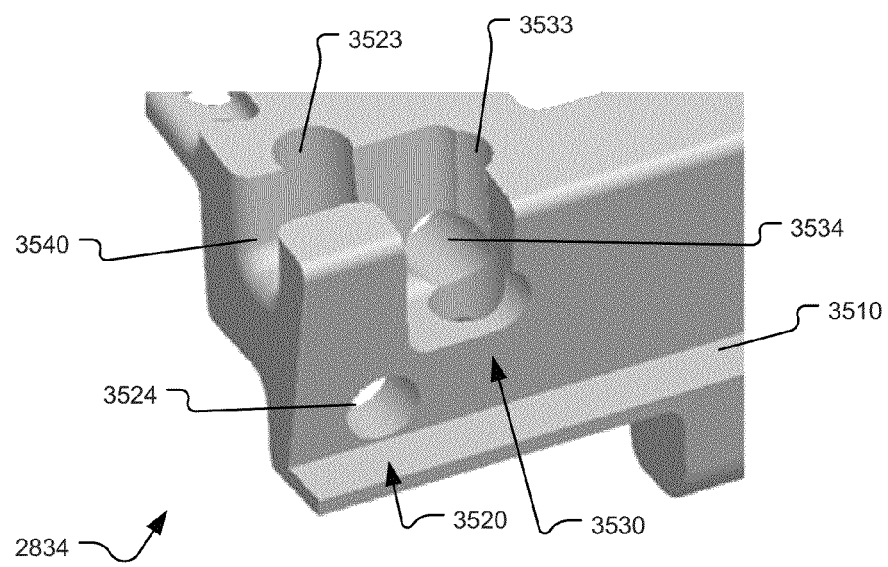

FIGS. 35A-35B illustrate perspective views of an interlock 2834 of a housing 104 in accordance with various embodiments of the present invention. FIG. 35A illustrates a core side of an injection mold, and FIG. 35B illustrates an injection mold cavity side. As shown in FIGS. 35A and 35B, a housing 104 may comprise an indentation 3510 which may be overmolded with injected polymer. As shown, the interlock 2834 comprises two single cross shaped chambers 3520, 3530. The first single cross shaped chamber 3520 comprises a Y-axis through-hole with opposing ends 3521 and 3523 and an X-axis through-hole with opposing ends 3522, 3524. The second single cross shaped chamber 3530 comprises a Y-axis through-hole with opposing ends 3531, 3533 and an X-axis through-hole with opposing ends 3532, 3534. As is shown in FIGS. 35A and 35B, the first and second single cross shaped chambers 3520, 3530 varies in that walls of through-holes are cut away and the center cavities are misaligned, with an extra chamber space 3540 passing through them. When the indentation 3510 is overmolded with injected polymer, the injected polymer may fill the first single cross shaped chamber 3520 and the second single cross shaped chamber 3530.

Figure 36A:
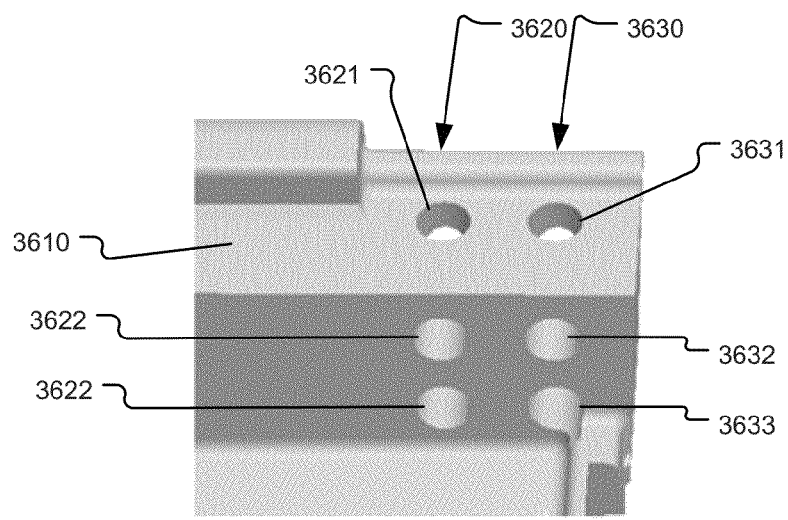
FIGS. 36A-36B illustrate perspective views of an interlock of a housing in accordance with various embodiments of the present invention.
Figure 36B:
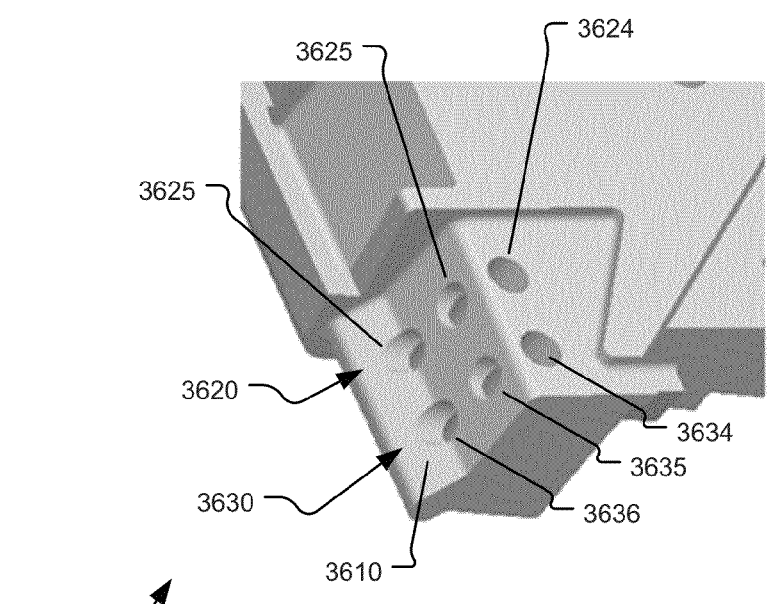

FIGS. 36A-36B illustrate perspective views of an interlock 2842 of the housing 104 in accordance with various embodiments the present invention. FIG. 36A illustrates a core side of an injection mold, and FIG. 30B illustrates an injection mold cavity side. As shown in FIGS. 36A and 36B, a housing 104 may comprise an indentation 3610 which may be overmolded with injected polymer. As shown, the interlock 2842 comprises two double cross shaped chambers 3620, 3630. The first double cross shaped chamber 3620 comprises a Y-axis through-hole with opposing ends 3621, 3624, a first X-axis through-hole with opposing ends 3622, 3625, and a second X-axis through-hole with opposing ends 3623, 3626. The second double cross shaped chamber 3630 comprises a Y-axis through-hole with opposing ends 3631, 3634, a first X-axis through-hole with opposing ends 3632, 3635, and a second X-axis through both opposing ends 3633, 3636. When the indentation 3610 is overmolded with injected polymer, the injected polymer may fill the first double cross shaped chamber 3620 and the second double cross shaped chamber 3630.

Figure 37A:
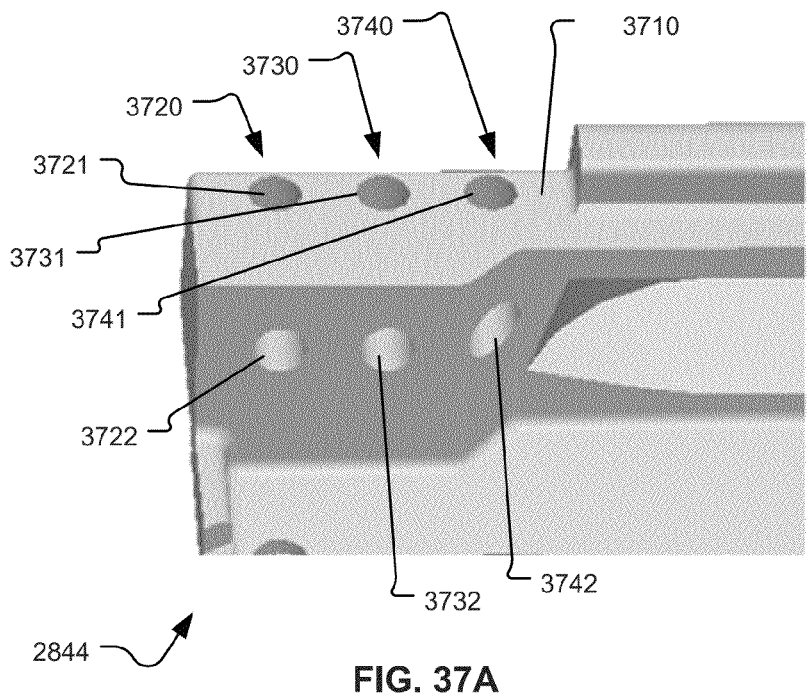
FIGS. 37A-37B illustrate perspective views of an interlock of a housing in accordance with various embodiments of the present invention.
Figure 37B:
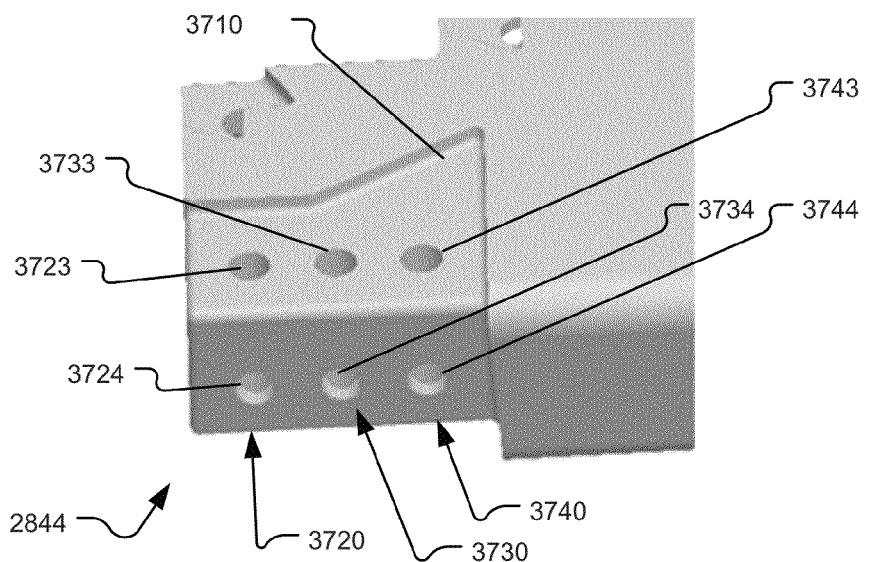

FIGS. 37A-37B illustrate perspective views of an interlock 2844 of a housing 104 in accordance with various embodiments of the present invention. FIG. 37A illustrates a core side of an injection mold, and FIG. 37B illustrates an injection mold cavity side. As shown in FIGS. 37A and 37B, a housing 104 may comprise an indentation 3710 which may be overmolded with injected polymer. As shown, the interlock 2844 comprises three single cross shaped chambers 3720, 3730, 3740. The first single cross shaped chamber 3720 comprises a Y-axis through-hole with opposing ends 3721 and 3723 and an X-axis through-hole with opposing ends 3722, 3724. The second single cross shaped chamber 3730 comprises a Y-axis through-hole with opposing ends 3731, 3733 and an X-axis through-hole with opposing ends 3732, 3734. The third single cross shaped chamber 3740 comprises a Y-axis through-hole with opposing ends 3741, 3743 and an X-axis through-hole with opposing ends 3742, 3744. As is shown in FIG. 37A, the end 3742 resides on a different plane than the ends 3722, 3742. When the indentation 3710 is overmolded with injected polymer, the injected polymer may fill the first single cross shaped chamber 3720, the second single cross shaped chamber 3730, and the second single cross shaped chamber 3740.

Mobile Computing Device

Figure 38:
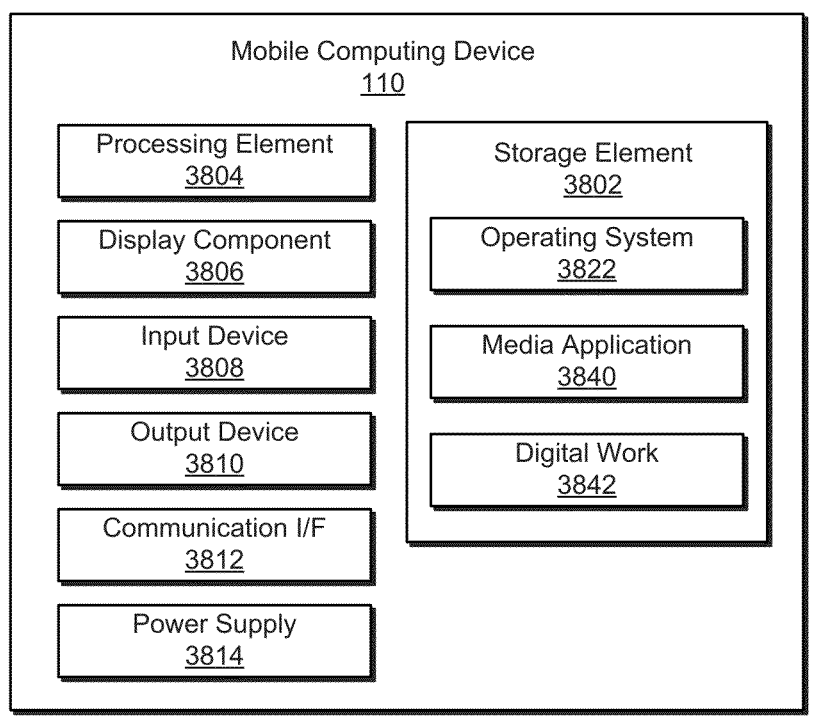
FIG. 38 illustrates an exemplary block diagram of a mobile computing device in accordance with embodiments of the present invention.

FIG. 38 illustrates an exemplary block diagram of a mobile computing device 100, in accordance with embodiments of the present invention. The mobile computing device 100 may be implemented as any of a number of electronic devices, such as an e-book reader, a tablet computing device, a smartphone, a media player, a portable gaming device, a portable digital assistant, a laptop computer, a desktop computer, and other devices providing media presentation functionality. It should be understood that various types of computing devices including a processing element, a memory, and a user interface for receiving user input can be used in accordance with various embodiments discussed herein.

The mobile computing device 100 may include a display component 3806, such as, for example, display panel 103. The display component 3806 may comprise, for example, one or more devices such as cathode ray tubes (CRTs), liquid crystal display (LCD) screens, gas plasma-based flat panel displays, LCD projectors, or other types of display devices, etc.

The mobile computing device 100 may include one or more input devices 3808 operable to receive inputs from a user. The input devices 3808 can include, for example, a push button, touch pad, touch screen, wheel, joystick, keyboard, mouse, trackball, keypad, accelerometer, light gun, game controller, or any other such device or element whereby a user can provide inputs to the mobile computing device 100. These input devices 3808 may be incorporated into the mobile computing device 100 or operably coupled to the mobile computing device 100 via wired or wireless interface. For computing devices with touch sensitive displays, the input devices 3808 can include a touch sensor that operates in conjunction with the display component 3806 to permit users to interact with the image displayed by the display component 3806 using touch inputs (e.g., with a finger or stylus).

The mobile computing device 100 may also include at least one communication interface 3812, comprising one or more wireless components operable to communicate with one or more separate devices within a communication range of the particular wireless protocol. The wireless protocol can be any appropriate protocol used to enable devices to communicate wirelessly, such as Bluetooth, cellular, IEEE 802.11, or infra-red communications protocols, such as an IrDA-compliant protocol. It should be understood that the mobile computing device 100 may also include one or more wired communications interfaces for coupling and communicating with other devices.

In accordance with some embodiments, a wired connection with the servicing dock may be established with the mobile computing device 100 via the servicing dock and the connection region of the package, while a wireless connection is also established between the mobile computing device 100 and another computing device. Accordingly, some servicing operations may be established via the servicing dock, such as, e.g., powering and recharging the electronic device, while other servicing operations may be performed wirelessly via the communication interface 3812, such as, e.g., updating or installing software on the electronic device and/or provisioning the electronic device for use on a cellular network. In some embodiments, a wired connection with the servicing dock may cause mobile computing device 100 to power on, after which a command is generated for the mobile computing device 100 to search for a known wireless signal through which data can be transferred. In other words, connecting a package device to a dock may cause the device to go into wireless seek mode for wireless servicing of the device.

The mobile computing device 100 may also include a power supply 3814, such as, for example, a rechargeable battery operable to be recharged through conventional plug-in approaches, or through other approaches such as capacitive charging.

The mobile computing device 100 also includes a processing element 3804 for executing instructions and retrieving data stored in a storage element 3802. As would be apparent to one of ordinary skill in the art, the storage element 3802 can include one or more different types of memory, data storage or computer-readable storage media, such as, for example, a first data storage for program instructions for execution by the processing element 3804, a second data storage for images or data and/or a removable storage for transferring data to other devices.

The storage element 3802 may store software for execution by the processing element 3804, such as, for example, operating system software 3822 and media application 3840. The storage element 3802 may also store data, such as, for example, files corresponding to one or more digital works 3842.

Embodiments of the present invention may provide various advantages not provided by prior art systems. The mobile computing device may be more easily repaired because of the more convenient way to open the device via the hinge retainer, the latch retainer, and the replaceable retainer of the display module and the ease with which a battery can be replaced because of the stretch releasing double-sided adhesive strip. The mobile computing device may also be more durable if dropped because of the hinge retainer, the latch retainer, and the replaceable retainer of the display module, the battery connector retainer of the housing, and the cross shaped chamber of the mechanical interlock of the injection molding of the housing. The mobile computing device may also be more aesthetically pleasing due to the proper alignment of the display module to the housing because of the hinge retainer, the latch retainer, and the replaceable retainer of the display module, the biased alignment of the port component because of the crush rib, the reduction in flaws of the housing because of the cross shaped chamber of the mechanical interlock of the injection molding, and the improved antenna reception because of the grounding clip.

While the invention has been described in terms of particular embodiments and illustrative figures, those of ordinary skill in the art will recognize that the invention is not limited to the embodiments or figures described. For example, many of the embodiments described may be applied to sealed devices that do not comprise a display module, such as sealed medical devices, alarm systems, and other devices that may require reworkability, durability, and tight fitting components.

Although various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and, consequently, are not described in detail herein. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the processes, flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. An electronic device, comprising:
   a housing comprising a first wall portion having a first lip, and a second wall portion opposite the first wall portion, said second wall portion having a second lip; and
   a display module comprising:
      a cover glass coupled to an upper surface of the first lip and an upper surface of the second lip;
      a display panel coupled to the cover glass;
      a hinge retainer coupled to the cover glass, said hinge retainer engaging a lower surface of the first lip; and
      a latch retainer coupled to the cover glass, said latch retainer engaging a lower surface of the second lip of the housing.

2. The electronic device of claim 1, wherein said hinge retainer comprises:
   a hinge retainer body coupled to the cover glass; and
   a hook bracket extending from the hinge retainer body, said hook bracket applying a clamping force to the lower surface of the first lip to couple the cover glass to the upper surface of the first lip.

3. The electronic device of claim 2, wherein:
   said housing comprises a bottom portion; and
   said hook bracket comprises a shank portion and a bumper portion, wherein said shank portion applies the clamping force to the lower surface of the first lip and said bumper portion engages the bottom portion of the housing.

4. The electronic device of claim 3, wherein:
   said shank portion is provided at a proximal end of the hook bracket and said bumper portion is provided at a distal end of the hook bracket; and
   said bumper portion applies a spring force against the bottom portion of the housing.

5. The electronic device of claim 3, wherein:
   said hinge retainer further comprises a retention bracket extending from the hinge retainer body, said retention bracket applying a clamping force to the lower surface of the first lip.

6. The electronic device of claim 5, wherein the retention bracket comprises:
   a retention spring coupled to the hinge retainer body; and
   a shelf extending from the retention spring, the shelf engaging the upper contact surface of a groove.

7. The electronic device of claim 1, wherein:
   said latch retainer comprises a latch retainer body coupled to the cover glass and a top retention clip extending from the latch retainer body, said top retention clip having a distal end engaging the lower surface of the second lip of the housing.

8. The electronic device of claim 7, wherein:
   said housing comprises a retention clip access opening exposing the top retention clip.

9. The electronic device of claim 1, wherein:
   said latch retainer of the display module further comprises a fastener receiving boss;
   said housing further comprises a fastener opening; and
   further comprising a fastener engaging the fastener receiving boss to couple the housing to the display module.

10. The electronic device of claim 1, wherein:
    said housing further comprises a side lip along a third wall portion between the first and second wall portions of the housing; and
    said display module further comprises a replaceable retainer comprising:
       a replaceable retainer body removably coupled to the cover glass; and
       a side retention clip extending from the replaceable retainer body and engaging the side lip of the housing.

11. The electronic device of claim 10, wherein the replaceable retainer body is removably adhered to the cover glass with a stretch releasing double-sided adhesive tape.

12. A computing device, comprising:
    a housing having a base, a bottom wall, a top wall, a first side wall and a second side wall, the first side wall and the second side wall each located between the bottom wall and the top wall and each orthogonal to the bottom wall and the top wall, the first side wall having a port opening;
    a battery module coupled to an interior portion of the base, said battery module comprising a battery connector;
    a plurality of stretch releasing double-sided adhesive strips coupling the battery module to the interior portion of the base, each stretch releasing double-sided adhesive strip having a non-adhesive pull tab;
    a battery connector retainer adapted to retain the battery connector coupled to a socket, the battery connector retainer comprising:
       a film layer;
       a first adhesive layer on a first surface of the film layer; and
       a non-adhesive pull tab extending from the film layer;
    a connector module comprising an alignment feature, the connector module coupled to a first interior portion of the base of the housing proximate the port opening;

a port component coupled to the connector module, said port component comprising a socket portion, wherein said alignment feature is adapted to bias the socket portion in a direction towards the port opening of the housing;

an antenna module comprising a conductive antenna portion and an electrically insulative substrate, the antenna module coupled to a second interior portion of the base of the housing and at least proximate an interior portion of one of the first side wall of the housing and the second side wall of the housing; and a grounding clip comprising a body and a prong extending from the body to contact the conductive antenna portion of the antenna module, the body of the grounding clip coupled to a third interior portion of the base of the housing, the third interior portion of the base of the housing proximate the second interior portion of the base of the housing.

13. The computing device of claim 12, wherein the alignment feature is adapted to deform when the socket portion of the port component abuts the port opening of the housing.

14. The computing device of claim 12, wherein:

the housing further comprises a first ridge extending from the first interior portion of the base of the housing proximate the port opening;

the connector module is configured to receive a force in a first direction; and the alignment feature comprises a protruding rib extending in a second direction non-parallel with the first direction.

15. The computing device of claim 14, wherein:

the first ridge of the housing comprises a metallic alloy material; and the protruding rib comprises a plastic material.

16. The computing device of claim 12, wherein:

the third interior portion of the base of the housing further comprises a second ridge comprising a metallic alloy; and the body of the grounding clip comprises a spine attached to a back leg and a front leg, the body electrically coupled to the second ridge of the housing, wherein the prong extends from the front leg of the body.

17. The computing device of claim 12, wherein:

the housing comprises a first portion comprised of a metallic alloy material;

the housing further comprises a second portion comprised of a plastic material; and the first portion of the housing comprises a first through hole and a second through hole orthogonal to the first through hole and intersecting with the first through hole, the first portion of the housing overmolded by the second portion of the housing, the first through hole and the second through hole receiving a portion of the plastic material of the second portion of the housing.

18. The computing device of claim 17, wherein:

the first portion of the housing comprises a third through hole parallel to the second through hole, orthogonal to the first through hole, and intersecting with the first through hole.

19. The computing device of claim 17, wherein:

the first portion of the housing comprises a third through hole parallel to the first through hole and a fourth through hole parallel to the second through hole, orthogonal to the third through hole, and intersecting with the third through hole.

20. The computing device of claim 12, wherein:

each stretch releasing double-sided adhesive strip has a tapered end opposite the non-adhesive pull tab.

\* \* \* \* \*